(12) United States Patent
Wang et al.

(10) Patent No.: US 9,661,308 B1
(45) Date of Patent: May 23, 2017

(54) INCREASING TOLERANCE OF SENSOR-SCANNER MISALIGNMENT OF THE 3D CAMERA WITH EPIPOLAR LINE LASER POINT SCANNING

(71) Applicant: Samsung Electronics Co., Ltd., Suwon-si, Gyeonggi-do (KR)

(72) Inventors: Yibing Michelle Wang, Temple City, CA (US); Ilia Ovsiannikov, Studio City, CA (US); Peter Deane, Manlo Park, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/989,716

(22) Filed: Jan. 6, 2016

Related U.S. Application Data

(60) Provisional application No. 62/253,122, filed on Nov. 9, 2015.

(51) Int. Cl.
*H04N 13/02* (2006.01)
*H04N 5/378* (2011.01)
*H04N 5/376* (2011.01)
*G06T 7/00* (2017.01)
*G06T 7/60* (2017.01)
*H04N 13/00* (2006.01)
*G01B 11/25* (2006.01)

(52) U.S. Cl.
CPC .......... *H04N 13/026* (2013.01); *G01B 11/25* (2013.01); *G06T 7/004* (2013.01); *G06T 7/0075* (2013.01); *G06T 7/60* (2013.01); *H04N 5/378* (2013.01); *H04N 5/3765* (2013.01); *H04N 13/0022* (2013.01); *H04N 13/0257* (2013.01); *G06T 2207/30244* (2013.01); *H04N 2013/0081* (2013.01)

(58) Field of Classification Search
CPC .. H04N 5/2256; H04N 5/2354; H04N 5/3765; H04N 13/0022; H04N 13/026; H04N 13/0257; H04N 2013/0081; G06T 11/25; G06T 7/004; G06T 7/0076; G06T 7/60; G06T 2207/30244
See application file for complete search history.

(56) References Cited

U.S. PATENT DOCUMENTS

| | | | | |
|---|---|---|---|---|
| 2014/0078381 A1* | 3/2014 | Ovsiannikov | ........ | H04N 5/2354 348/370 |
| 2015/0285625 A1* | 10/2015 | Deane | ..................... | G01S 17/10 348/140 |
| 2016/0309140 A1* | 10/2016 | Wang | ..................... | G01B 11/00 |

* cited by examiner

*Primary Examiner* — Tuan Ho
(74) *Attorney, Agent, or Firm* — Renaissance IP Law Group LLP

(57) ABSTRACT

Using the same image sensor to capture a two-dimensional (2D) image and three-dimensional (3D) depth measurements for a 3D object. A laser point-scans the surface of the object with light spots, which are detected by a pixel array in the image sensor to generate the 3D depth profile of the object using triangulation. Each row of pixels in the pixel array forms an epipolar line of the corresponding laser scan line. Timestamping provides a correspondence between the pixel location of a captured light spot and the respective scan angle of the laser to remove any ambiguity in triangulation. An Analog-to-Digital Converter (ADC) in the image sensor operates as a Time-to-Digital Converter (TDC) to generate timestamps. When the epipolar line is misaligned or curved, multiple TDC arrays acquire timestamps of multiple pixels (in multiple rows) substantially simultaneously. Multiple timestamp values are reconciled to obtain a single timestamp value for a light spot.

20 Claims, 11 Drawing Sheets

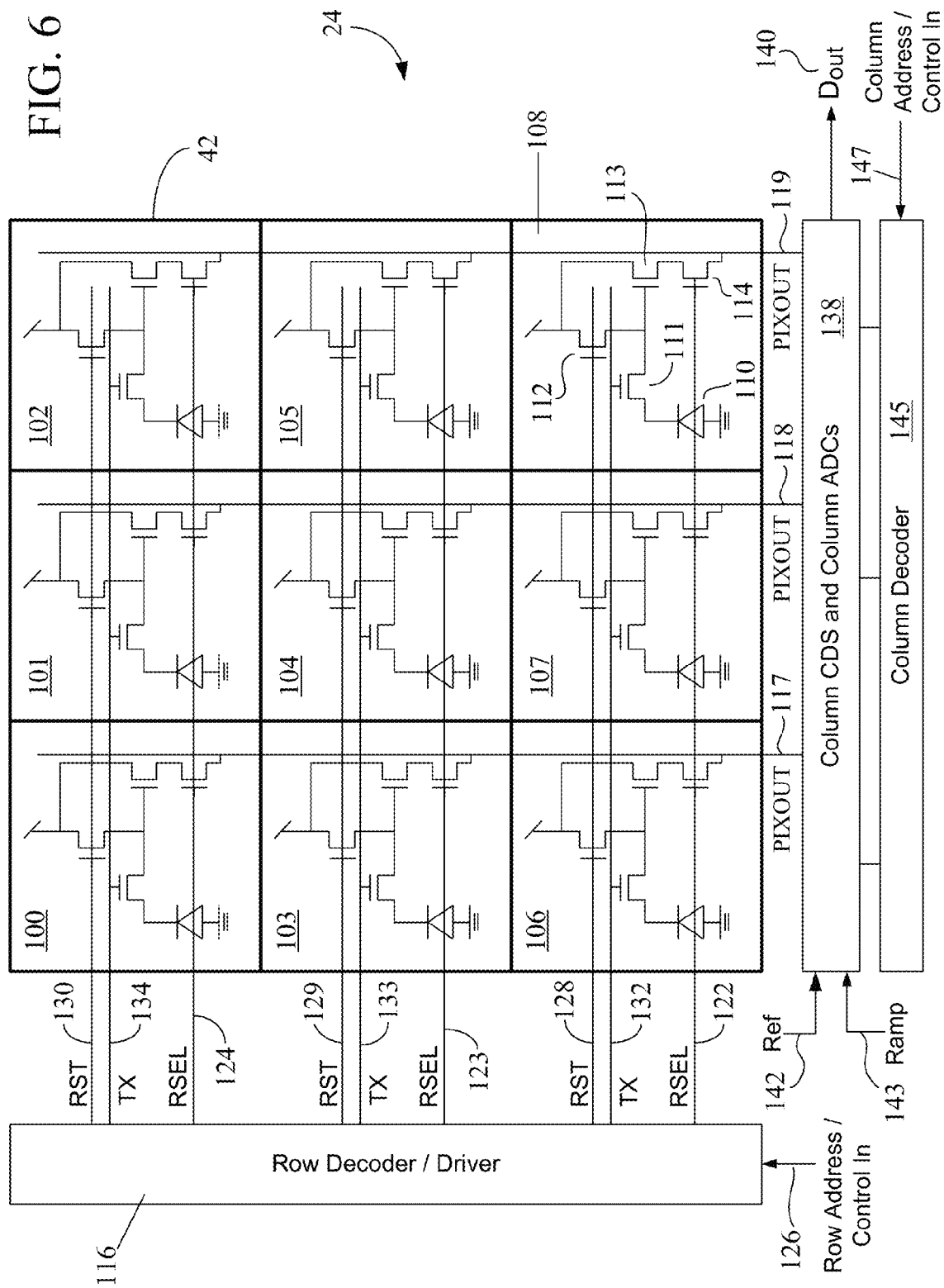

R = Red, B = Blue, G = Green

INCREASING TOLERANCE OF SENSOR-SCANNER MISALIGNMENT OF THE 3D CAMERA WITH EPIPOLAR LINE LASER POINT SCANNING

CROSS-REFERENCE TO RELATED APPLICATIONS

This application claims the priority benefit under 35 U.S.C. §119(e) of U.S. Provisional Application No. 62/253,122 filed on Nov. 9, 2015, the disclosure of which is incorporated herein by reference in its entirety.

TECHNICAL FIELD

The present disclosure generally relates to image sensors. More specifically, and not by way of limitation, particular embodiments of the inventive aspects disclosed in the present disclosure are directed to increasing tolerance of imperfect laser scan lines in a triangulation-based system and method of depth measurements on a three-dimensional (3D) object using a laser point scan and a Complementary Metal Oxide Semiconductor (CMOS) image sensor, which is also used for two-dimensional (2D) imaging of the 3D object.

BACKGROUND

Three-dimensional (3D) imaging systems are increasingly being used in a wide variety of applications such as, for example, industrial production, video games, computer graphics, robotic surgeries, consumer displays, surveillance videos, 3D modeling, real estate sales, and so on.

Existing 3D imaging technologies may include, for example, the time-of-flight (TOF) based range imaging, stereo vision systems, and structured light (SL) methods.

In the TOF method, distance to a 3D object is resolved based on the known speed of light—by measuring the round-trip time it takes for a light signal to travel between a camera and the 3D object for each point of the image. A TOF camera may use a scannerless approach to capture the entire scene with each laser or light pulse. Some example applications of the TOF method may include advanced automotive applications such as active pedestrian safety or pre-crash detection based on distance images in real time, to track movements of humans such as during interaction with games on video game consoles, in industrial machine vision to classify objects and help robots find the items such as items on a conveyor belt, and so on.

In stereoscopic imaging or stereo vision systems, two cameras—displaced horizontally from one another—are used to obtain two differing views on a scene or a 3D object in the scene. By comparing these two images, the relative depth information can be obtained for the 3D object. Stereo vision is highly important in fields such as robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In the SL approach, the 3D shape of an object may be measured using projected light patterns and a camera for imaging. In the SL method, a known pattern of light—often grids or horizontal bars or patterns of parallel stripes—is projected onto a scene or a 3D object in the scene. The projected pattern may get deformed or displaced when striking the surface of the 3D objet. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging maybe used in different applications such as, for example, by a police force to photograph fingerprints in a 3D scene, inline inspection of components during a production process, in health care for live measurements of human body shapes or the micro structures of human skin, and the like.

SUMMARY

In one embodiment, the present disclosure is directed to a method that comprises: (i) performing a one-dimensional (1D) point scan of a three-dimensional (3D) object along a scanning line using a light source, wherein the point scan projects a sequence of light spots on a surface of the 3D object; (ii) selecting a plurality of rows of pixels in an image sensor, wherein the image sensor has a plurality of pixels arranged in a two-dimensional (2D) array forming an image plane, and wherein at least one of the plurality of the selected rows forms a portion of an epipolar line of the scanning line on the image plane; (iii) for pixels in the selected rows of pixels, sensing a pixel-specific detection of a corresponding light spot in the sequence of light spots; (iv) for a group of pixels detecting a common light spot, generating a pixel-specific timestamp value for each pixel in the group substantially simultaneously; and (v) determining a distance to the common light spot on the surface of the 3D object based at least on the generated pixel-specific timestamp values and on a scan angle used by the light source for projecting the common light spot.

In another embodiment, the present disclosure is directed to an imaging unit that comprises: (i) a light source operative to perform a 1D point scan of a 3D object along a scanning line, wherein the point scan projects a sequence of light spots on a surface of the 3D object; and (ii) an image sensor unit. The image sensor unit includes: (i) a plurality of pixels arranged in a 2D pixel array forming an image plane, wherein each pixel in a column of pixels in the 2D pixel array is associated with a respective row of pixels in the 2D pixel array, and wherein each pixel in the column of pixels is operative to detect a corresponding light spot in the sequence of light spots; (ii) a plurality of Analog-to-Digital Converter (ADC) units per column of pixels in the 2D pixel array, wherein at least two adjacent pixels in a column of pixels are connected to different ADC units, and wherein each ADC unit is operative to generate a pixel-specific timestamp value for a respective pixel connected thereto in response to a pixel-specific detection of the corresponding light spot by the respective pixel; (iii) a processing unit coupled to the plurality of ADC units. In the image sensor unit, the processing unit is operative to perform the following: (i) select a plurality of rows of pixels in the 2D pixel array associated with a group of pixels detecting a common light spot in the sequence of light spots, wherein at least one of the plurality of the selected rows forms a portion of an epipolar line of the scanning line on the image plane; (ii) for pixels in the selected rows of pixels, sense a pixel-specific detection of the common light spot; (iii) trigger the ADC units associated with the pixels in the group of pixels so as to substantially simultaneously generate a pixel-specific timestamp value for each pixel in the group of pixels; and (iv) determine a distance to the common light spot on the surface of the 3D object based at least on the generated pixel-specific timestamp values and on a scan angle used by the light source for projecting the common light spot.

In a further embodiment, the present disclosure is directed to a system, which comprises: (i) a light source; (ii) a plurality of pixels arranged in a 2D pixel array; (iii) a plurality of ADC units per column of pixels in the 2D pixel array; (iv) a memory for storing program instructions; and (v) a processor coupled to the memory and to the plurality of ADC units. In the system, the light source is operative to perform a 1D point scan of a 3D object along a scanning line, wherein the point scan projects a sequence of light spots on a surface of the 3D object. The 2D pixel array forms an image plane, wherein each pixel in a column of pixels in the 2D pixel array is associated with a respective row of pixels in the 2D pixel array, and wherein each pixel in the column of pixels is operative to detect a corresponding light spot in the sequence of light spots. In the system, at least two adjacent pixels in a column of pixels are connected to different ADC units, and wherein each ADC unit is operative to generate a pixel-specific timestamp value for a respective pixel connected thereto in response to a pixel-specific detection of the corresponding light spot by the respective pixel. The processor in the system is configured to execute the program instructions, whereby the processor is operative to perform the following: (i) select a plurality of rows of pixels in the 2D pixel array associated with a group of pixels detecting a common light spot in the sequence of light spots, wherein at least one of the plurality of the selected rows forms a portion of an epipolar line of the scanning line on the image plane; (ii) for pixels in the selected rows of pixels, sense a pixel-specific detection of the common light spot; (iii) trigger the ADC units associated with the pixels in the group of pixels so as to substantially simultaneously generate a pixel-specific timestamp value for each pixel in the group of pixels; and (iv) determine a distance to the common light spot on the surface of the 3D object based at least on the generated pixel-specific timestamp values and on a scan angle used by the light source for projecting the common light spot.

BRIEF DESCRIPTION OF THE DRAWINGS

In the following section, the inventive aspects of the present disclosure will be described with reference to exemplary embodiments illustrated in the figures, in which:

FIG. 6 shows exemplary circuit details of the 2D pixel array and a portion of the associated processing circuits in the image processing unit of the image sensor in FIGS. 1-2 according to one embodiment of the present disclosure;

DETAILED DESCRIPTION

Figure 1:
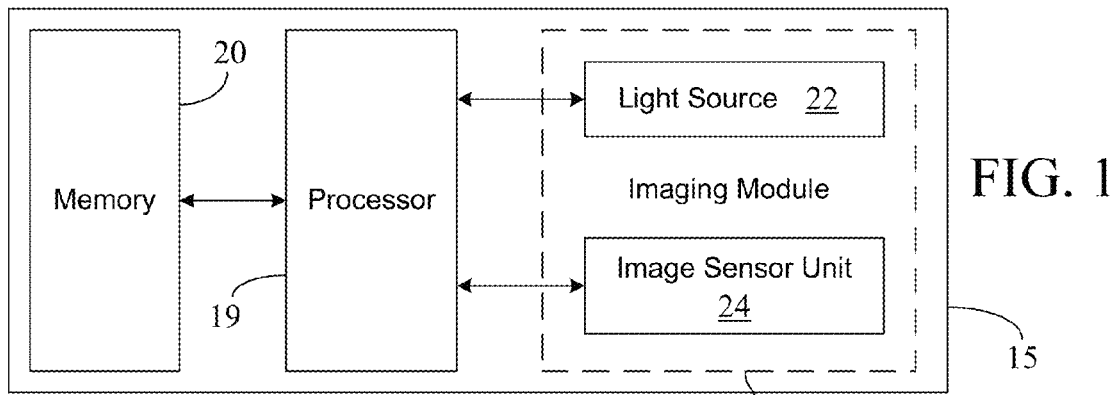
FIG. 1 shows a highly simplified, partial layout of a system according to one embodiment of the present disclosure.

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, the described inventive aspects can be implemented to perform low power, 3D depth measurements in any imaging device or system, including, for example, a smartphone, a User Equipment (UE), a laptop computer, and the like.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "two-dimensional," "pre-determined", "pixel-specific," etc.) may be occasionally interchangeably used with its non-hyphenated version (e.g., "two dimensional," "predetermined", "pixel specific," etc.), and a capitalized entry (e.g., "Counter Clock," "Row Select," "PIXOUT," etc.) may be interchangeably used with its non-capitalized version (e.g., "counter clock," "row select," "pixout," etc.). Such occasional interchangeable uses shall not be considered inconsistent with each other.

It is noted at the outset that the terms "coupled," "operatively coupled," "connected", "connecting," "electrically connected," etc., may be used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale. Similarly, various waveforms and timing diagrams are shown for illustrative purpose only.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. However, such usage is for simplicity of illustration and ease of discussion only; it does not imply that the construction or architectural details of such components or units are the same across all embodiments or such commonly-referenced parts/modules are the only way to implement the teachings of particular embodiments of the present disclosure.

It is observed here that the earlier-mentioned 3D technologies have many drawbacks. For example, a TOF-based 3D imaging system may require high power to operate optical or electrical shutters. These systems typically operate over a range of few meters to several tens of meters, but the resolution of these systems decreases for measurements over short distances, thereby making 3D imaging within a distance of about one meter almost impractical. Hence, a TOF system may not be desirable for cell phone-based camera applications, where pictures are pre-dominantly taken at close distances. A TOF sensor may also require special pixels with big pixel sizes, usually larger than 7 µm. These pixels also may be vulnerable to ambient light.

The stereoscopic imaging approach generally works only with textured surfaces. It has high computational complexity because of the need to match features and find correspondences between the stereo pair of images of an object. This requires high system power, which is not a desirable attribute where power conservation is needed, such as in smartphones. Furthermore, stereo imaging requires two regular, high bit resolution sensors along with two lenses, making the entire assembly unsuitable for applications in portable devices, like cell phones or tablets, where device real estate is at a premium.

The SL approach introduces distance ambiguity, and also requires high system power. For 3D depth measurements, the SL method may need multiple images with multiple patterns—all of these increase computational complexity and power consumption. Furthermore, the SL imaging may also require regular image sensors with high bit resolution. Thus, a structured light-based system may not be suitable for low-cost, low-power, compact image sensors in smartphones.

In contrast to the above-mentioned 3D technologies, particular embodiments of the present disclosure provide for implementing a low power, 3D imaging system on portable electronic devices such as smartphones, tablets, UEs, and the like. A 2D imaging sensor as per particular embodiments of the present disclosure can capture both 2D RGB (Red, Green, Blue) images and 3D depth measurements with visible light laser scanning. It is noted here that although the following discussion may frequently mention the visible light laser as a light source for point-scans and a 2D RGB sensor as an image/light capture device, such mention is for the purpose of illustration and consistency of discussion only. The visible laser and RGB sensor based examples discussed below may find applications in low-power, consumer-grade mobile electronic devices with cameras such as, for example, smartphones, tablets, or UEs. However, it is understood that the teachings of the present disclosure are not limited to the visible laser-RGB sensor based examples mentioned below. Rather, according to particular embodiments of the present disclosure, the point scan-based 3D depth measurements and the ambient light rejection methodology may be performed using many different combinations of 2D sensors and laser light sources (for point scans) such as, for example: (i) a 2D color (RGB) sensor with a visible light laser source, in which the laser source may be a red (R), green (G), or blue (B) light laser, or a laser source producing a combination of these lights; (ii) a visible light laser with a 2D RGB color sensor having an Infrared (IR) cut filter; (iii) a Near Infrared (NIR) laser with a 2D IR sensor; (iv) an NIR laser with a 2D NIR sensor; (v) an NIR laser with a 2D RGB sensor (without an IR cut filter); (vi) an NIR laser with a 2D RGB sensor (without an NIR cut filter); (vii) a 2D RGB-IR sensor with visible or NIR laser; (viii) a 2D RGBW (red, green, blue, white) sensor with either visible or NIR laser; and so on.

During 3D depth measurements, the entire sensor may operate as a binary sensor in conjunction with the laser scan to reconstruct 3D content. In particular embodiments, the pixel size of the sensor can be as small as 1 µm. Furthermore, due to lower bit resolution, the Analog-to-Digital Converter (ADC) units in the image sensor according to particular embodiments of the present disclosure may require significantly much lower processing power than that is needed for high bit resolution sensors in traditional 3D imaging systems. Because of the need for less processing power, the 3D imaging module according to present disclosure may require low system power and, hence, may be quite suitable for inclusion in low power devices like smartphones.

In particular embodiments, the present disclosure uses triangulation and point scans with a laser light source for 3D depth measurements with a group of line sensors. The laser scanning plane and the imaging plane are oriented using epipolar geometry. An image sensor according to one embodiment of the present disclosure may use timestamps to remove ambiguity in the triangulation approach, thereby reducing the amount of depth computations and system power. The same image sensor—that is, each pixel in the image sensor—may be used in the normal 2D (RGB color or non-RGB) imaging mode as well as in the 3D laser scan mode. However, in the laser scan mode, the resolution of the ADCs in the image sensor is reduced to a binary output (1-bit resolution only), thereby improving the readout speed and reducing power consumption—for example, due to switching in the ADC units—in the chip incorporating the image sensor and associated processing units. Furthermore, the point scan approach may allow the system to take all measurements in one pass, thereby reducing the latency for depth measurements and reducing motion blur.

As noted before, in particular embodiments, the entire image sensor may be used for routine 2D RGB color imaging using, for example, ambient light, as well as for 3D depth imaging using visible laser scan. Such dual use of the same camera unit may save space and cost for mobile devices. Furthermore, in certain applications, the use of visible laser for 3D applications may be better for a user's eye safety as compared to a Near Infrared (NIR) laser. The sensor may have higher quantum efficiency at visible spectrum that at the NIR spectrum, leading to lower power consumption of the light source. In one embodiment, the dual-use image sensor may work in a linear mode of operation for 2D imaging—as a regular 2D sensor. However, for 3D imaging, the sensor may work in linear mode under moderate lighting condition and in logarithmic mode under strong ambient light to facilitate continued use of the visible laser source through rejection of the strong ambient light. Furthermore, ambient light rejection may be needed in case of an NIR laser as well, for example, when the bandwidth of the pass band of an IR-cut filter employed with an RGB sensor is not narrow enough.

FIG. 1 shows a highly simplified, partial layout of a system 15 according to one embodiment of the present disclosure. As shown, the system 15 may include an imaging module 17 coupled to and in communication with a processor or host 19. The system 15 may also include a memory module 20 coupled to the processor 19 to store information content such as, for example, image data received from the imaging module 17. In particular embodiments, the entire system 15 may be encapsulated in a single Integrated Circuit (IC) or chip. Alternatively, each of the modules 17, 19, and 20 may be implemented in a separate chip. Furthermore, the memory module 20 may include more than one memory chip, and the processor module 19 may comprise of multiple processing chips as well. In any event, the details about packaging of the modules in FIG. 1 and how they are fabricated or implemented—in a single chip or using multiple discrete chips—are not relevant to the present discussion and, hence, such details are not provided herein.

The system 15 may be any low power, electronic device configured for 2D and 3D camera applications as per teachings of the present disclosure. The system 15 may be portable or non-portable. Some examples of the portable version of the system 15 may include popular consumer electronic gadgets such as, for example, a mobile device, a cellphone, a smartphone, a User Equipment (UE), a tablet, a digital camera, a laptop or desktop computer, an electronic smartwatch, a Machine-to-Machine (M2M) communication unit, a Virtual Reality (VR) equipment or module, a robot, and the like. On the other hand, some examples of the non-portable version of the system 15 may include a game console in a video arcade, an interactive video terminal, an automobile, a machine vision system, an industrial robot, a VR equipment, a driver-side mounted camera in a car (for example, to monitor whether the driver is awake or not), and so on. The 3D imaging functionality provided as per teachings of the present disclosure may be used in many applications such as, for example, virtual reality applications on a virtual reality equipment, online chatting/gaming, 3D texting, searching an online or local (device-based) catalog/database using a product's 3D image to obtain information related to the product (for example, calorie content of a piece of food item), robotics and machine vision applications, automobile applications such as autonomous driving applications, and the like.

In particular embodiments of the present disclosure, the imaging module 17 may include a light source 22 and an image sensor unit 24. As discussed in more detail with reference to FIG. 2 below, in one embodiment, the light source 22 may be a visible laser. In other embodiments, the light source may be an NIR laser. The image sensor unit 24 may include a pixel array and ancillary processing circuits as shown in FIG. 2 and also discussed below.

In one embodiment, the processor 19 may be a CPU, which can be a general purpose microprocessor. In the discussion herein, the terms "processor" and "CPU" may be used interchangeably for ease of discussion. However, it is understood that, instead of or in addition to the CPU, the processor 19 may contain any other type of processors such as, for example, a microcontroller, a Digital Signal Processor (DSP), a Graphics Processing Unit (GPU), a dedicated Application Specific Integrated Circuit (ASIC) processor, and the like. Furthermore, in one embodiment, the processor/host 19 may include more than one CPU, which may be operative in a distributed processing environment. The processor 19 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In one embodiment, the processor 19 may be a System on Chip (SoC) having functionalities in addition to a CPU functionality.

In particular embodiments, the memory module 20 may be a Dynamic Random Access Memory (DRAM) such as, for example, a Synchronous DRAM (SDRAM), or a DRAM-based Three Dimensional Stack (3DS) memory module such as, for example, a High Bandwidth Memory (HBM) module, or a Hybrid Memory Cube (HMC) memory module. In other embodiments, the memory module 20 may be a Solid State Drive (SSD), a non-3DS DRAM module, or any other semiconductor-based storage system such as, for example, a Static Random Access Memory (SRAM), a Phase-Change Random Access Memory (PRAM or PCRAM), a Resistive Random Access Memory (RRAM or ReRAM), a Conductive-Bridging RAM (CBRAM), a Magnetic RAM (MRAM), a Spin-Transfer Torque MRAM (STT-MRAM), and the like.

Figure 2:
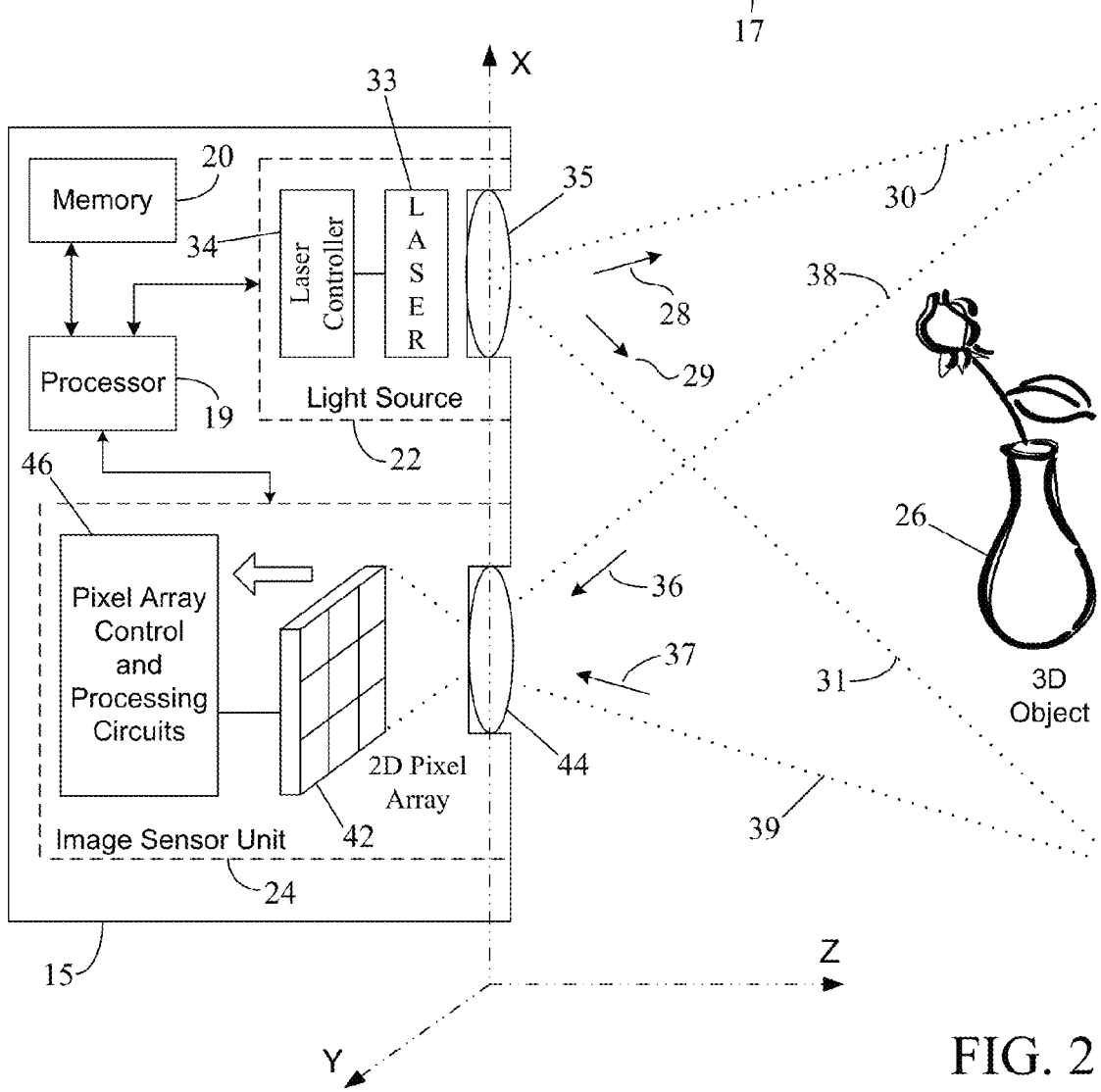
FIG. 2 illustrates an exemplary operational layout of the system in FIG. 1 according to one embodiment of the present disclosure.

FIG. 2 illustrates an exemplary operational layout of the system 15 in FIG. 1 according to one embodiment of the present disclosure. The system 15 may be used to obtain depth information (along the Z-axis) for a 3D object, such as the 3D object 26, which may be an individual object or an object within a scene (not shown). In one embodiment, the depth information may be calculated by the processor 19 based on the scan data received from the image sensor unit 24. In another embodiment, the depth information may be calculated by the image sensor unit 24 itself such as, for example, in case of the image sensor unit in the embodiment of FIG. 7A. In particular embodiments, the depth information may be used by the processor 19 as part of a 3D user interface to enable the user of the system 15 to interact with the 3D image of the object or use the 3D image of the object as part of games or other applications running on the system 15. The 3D imaging as per teachings of the present disclosure may be used for other purposes or applications as well, and may be applied to substantially any scene or 3D objects.

In FIG. 2, the X-axis is taken to be the horizontal direction along the front of the device 15, the Y-axis is the vertical direction (out of the page in this view), and the Z-axis extends away from the device 15 in the general direction of the object 26 being imaged. For the depth measurements, the optical axes of the modules 22 and 24 may be parallel to the Z-axis. Other optical arrangements may be used as well to implement the principles described herein, and these alternative arrangements are considered to be within the scope of the present disclosure.

The light source module 22 may illuminate the 3D object 26 as shown by exemplary arrows 28-29 associated with corresponding dotted lines 30-31 representing an illumination path of a light beam or optical radiation that may be used to point scan the 3D object 26 within an optical field of view. A line-by-line point scan of the object surface may be performed using an optical radiation source, which, in one embodiment, may be a laser light source 33 operated and controlled by a laser controller 34. A light beam from the laser source 33 may be point scanned—under the control of the laser controller 34—in the X-Y direction across the surface of the 3D object 26 via projection optics 35. The point scan may project light spots on the surface of the 3D object along a scan line, as discussed in more detail with reference to FIGS. 4-5 below. The projection optics may be a focusing lens, a glass/plastics surface, or other cylindrical optical element that concentrates laser beam from the laser 33 as a point or spot on that surface of the object 26. In the embodiment of FIG. 2, a convex structure is shown as a focusing lens 35. However, any other suitable lens design may be selected for projection optics 35. The object 26 may be placed at a focusing location where illuminating light from the light source 33 is focused by the projection optics 35 as a light spot. Thus, in the point scan, a point or narrow area/spot on the surface of the 3D object 26 may be illuminated sequentially by the focused light beam from the projection optics 35.

In particular embodiments, the light source (or illumination source) 33 may be a diode laser or a Light Emitting Diode (LED) emitting visible light, an NIR laser, a point light source, a monochromatic illumination source (such as, for example, a combination of a white lamp and a monochromator) in the visible light spectrum, or any other type of laser light source. The laser 33 may be fixed in one position within the housing of the device 15, but may be rotatable in X-Y directions. The laser 33 may be X-Y addressable (for example, by the laser controller 34) to perform point scan of the 3D object 26. In one embodiment, the visible light may be substantially green light. The visible light illumination from the laser source 33 may be projected onto the surface of the 3D object 26 using a mirror (not shown), or the point scan may be completely mirror-less. In particular embodiments, the light source module 22 may include more or less components than those shown in the exemplary embodiment of FIG. 2.

In the embodiment of FIG. 2, the light reflected from the point scan of the object 26 may travel along a collection path indicated by arrows 36-37 and dotted lines 38-39. The light collection path may carry photons reflected from or scattered by the surface of the object 26 upon receiving illumination from the laser source 33. It is noted here that the depiction of various propagation paths using solid arrows and dotted lines in FIG. 2 (and also in FIGS. 4-5, as applicable) is for illustrative purpose only. The depiction should not be construed to illustrate any actual optical signal propagation paths. In practice, the illumination and collection signal paths may be different from those shown in FIG. 2, and may not be as clearly-defined as in the illustration in FIG. 2.

The light received from the illuminated object 26 may be focused onto one or more pixels of a 2D pixel array 42 via collection optics 44 in the image sensor unit 24. Like the projection optics 35, the collection optics 44 may be a focusing lens, a glass/plastics surface, or other cylindrical optical element that concentrates the reflected light received from the object 26 onto one or more pixels in the 2D array 42. In the embodiment of FIG. 2, a convex structure is shown as a focusing lens 44. However, any other suitable lens design may be selected for collection optics 44. Furthermore, for ease of illustration, only a 3×3 pixel array is shown in FIG. 2 (and also in FIG. 6). However, it is understood that, modern pixel arrays contain thousands or even millions of pixels. The pixel array 42 may be an RGB pixel array, in which different pixels may collect light signals of different colors. As mentioned before, in particular embodiments, the pixel array 42 may be any 2D sensor such as, for example, a 2D RGB sensor with IR cut filter, a 2D IR sensor, a 2D NIR sensor, a 2D RGBW sensor, a 2D RWB (Red, White, Blue) sensor, a multi-layer CMOS organic sensor, a 2D RGB-IR sensor, and the like. As discussed in more detail later, the system 15 may use the same pixel array 42 for 2D RGB color imaging of the object 26 (or a scene containing the object) as well as for 3D imaging (involving depth measurements) of the object 26. Additional architectural details of the pixel array 42 are discussed later with reference to FIG. 6.

Figure 7A:
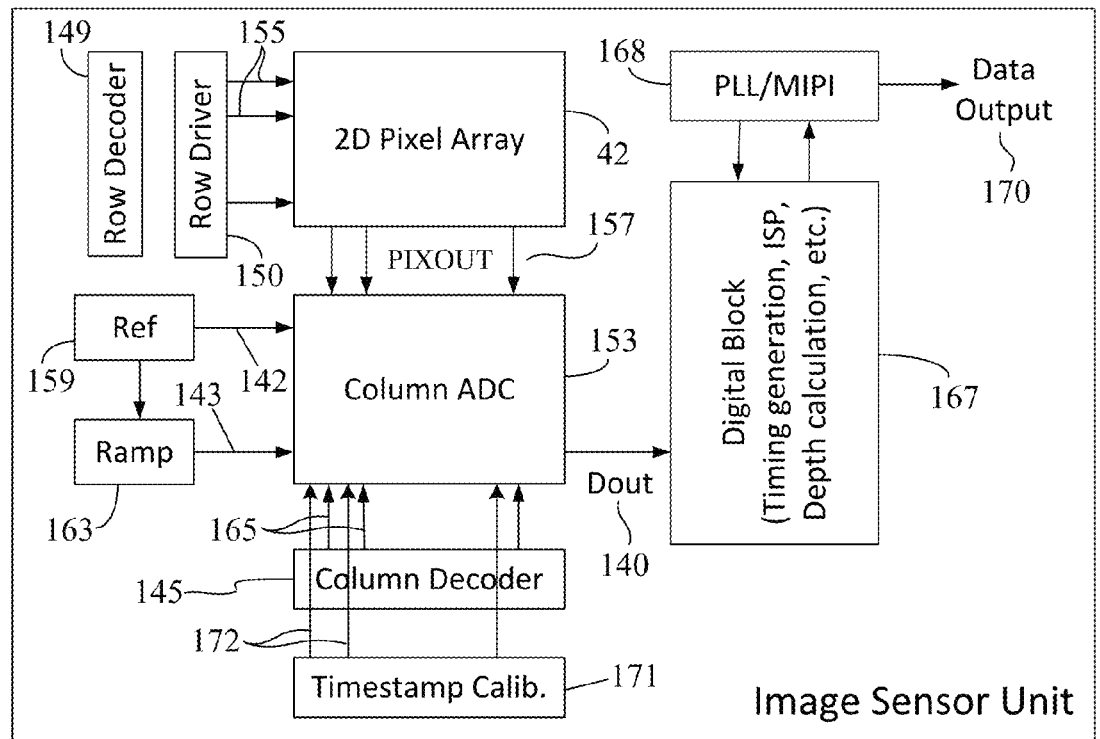
FIG. 7A is an exemplary layout of an image sensor unit according to one embodiment of the present disclosure.
Figure 7B:
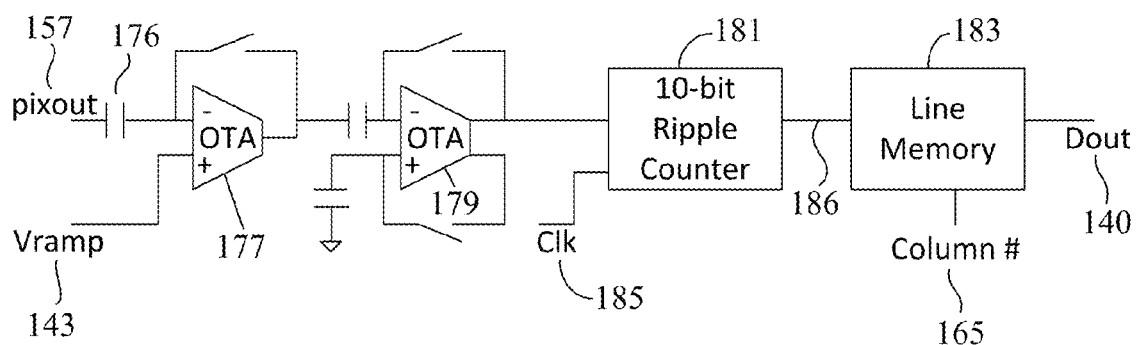
FIG. 7B shows architectural details of an exemplary CDS+ADC unit for 3D depth measurement according to one embodiment of the present disclosure.

The pixel array 42 may convert the received photons into corresponding electrical signals, which are then processed by the associated image processing unit 46 to determine the 3D depth image of the object 26. In one embodiment, the image processing unit 46 may use triangulation for depth measurements. The triangulation approach is discussed later with reference to FIG. 4. The image processing unit 46 may also include relevant circuits for controlling the operation of the pixel array 42. Exemplary image processing and control circuits are illustrated in FIGS. 7A-7B, which are discussed later below.

The processor 19 may control the operations of the light source module 22 and the image sensor unit 24. For example, the system 15 may have a mode switch (not shown) controllable by the user to switch from 2D imaging mode to 3D imaging mode. When the user selects the 2D imaging mode using the mode switch, the processor 19 may activate the image sensor unit 24, but may not activate the light source module 22 because 2D imaging may use ambient light. On the other hand, when the user selects 3D imaging using the mode switch, the processor 19 may activate both of the modules 22, 24 (as discussed below). The processed image data received from the image processing unit 46 may be stored by the processor 19 in the memory 20. The processor 19 may also display the user-selected 2D or 3D image on a display screen (not shown) of the device 15. The processor 19 may be programmed in software or firmware to carry out various processing tasks described herein. Alternatively or additionally, the processor 19 may comprise programmable hardware logic circuits for carrying out some or all of its functions. In particular embodiments, the memory 20 may store program code, look-up tables, and/or interim computational results to enable the processor 19 to carry out its functions.

Figure 3:
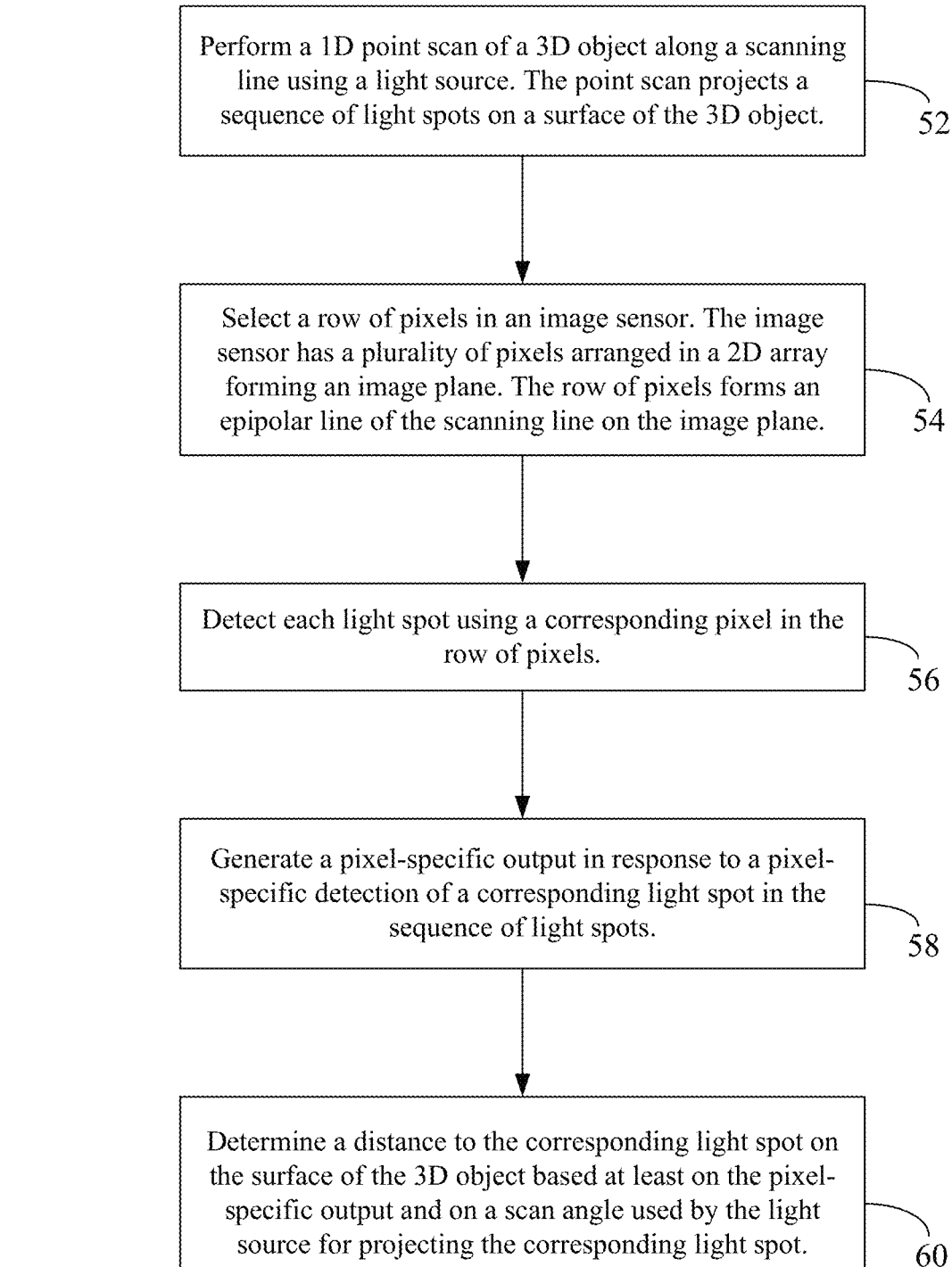
FIG. 3 depicts an exemplary flowchart showing how 3D depth measurements may be performed according to one embodiment of the present disclosure.

FIG. 3 depicts an exemplary flowchart 50 showing how 3D depth measurements may be performed according to one embodiment of the present disclosure. Various steps illustrated in FIG. 3 may be performed by a single module or a combination of modules or system components in the system 15. In the discussion herein, by way of an example only, specific tasks are described as being performed by specific modules or system components. Other modules or system components may be suitably configured to perform such tasks as well.

In FIG. 3, at block 52, the system 15 (more specifically, the processor 19) may perform a one-dimensional (1D) point scan of a 3D object, such as the object 26 in FIG. 2, along a scanning line using a light source, such as the light source module 22 in FIG. 2. As part of the point scan, the light source module 22 may be configured, for example, by the processor 19, to project a sequence of light spots on a surface of the 3D object 26 in a line-by-line manner. At block 54, the pixel processing unit 46 in the system 15 may select a row of pixels in an image sensor, such as the 2D pixel array 42 in FIG. 2. The image sensor 42 has a plurality of pixels arranged in a 2D array forming an image plane, and, in one embodiment, the selected row of pixels forms an epipolar line of the scanning line (at block 52) on the image plane. A brief discussion of epipolar geometry is provided below with reference to FIG. 4. At block 56, the pixel processing unit 46 may be operatively configured by the processor 19 to detect each light spot using a corresponding pixel in the row of pixels. It is observed here that light reflected from an illuminated light spot may be detected by a single pixel or more than one pixel such as, for example, when the light reflected from the illuminated spot gets focused by the collection optics 44 onto two or more adjacent pixels. On the other hand, it may be possible that light reflected from two or more light spots may be collected at a single pixel in the 2D array 42. The timestamp-based approach discussed below removes depth calculation-related ambiguities resulting from imaging of two different spots by the same pixel or imaging of a single spot by two different pixels. At block 58, the image processing unit 46—as suitably configured by the processor 19—may generate a pixel-specific output in response to a pixel-specific detection (at block 56) of a corresponding light spot in the sequence of light spots (in the point scan at block 52). Consequently, at block 60, the image processing unit 46 may determine the 3D distance (or depth) to the corresponding light spot on the surface of the 3D object based at least on the pixel-specific output (at block 58) and on a scan angle used by the light source for projecting the corresponding light spot (at block 52). The depth measurement is discussed in more detail with reference to FIG. 4.

Figure 4:
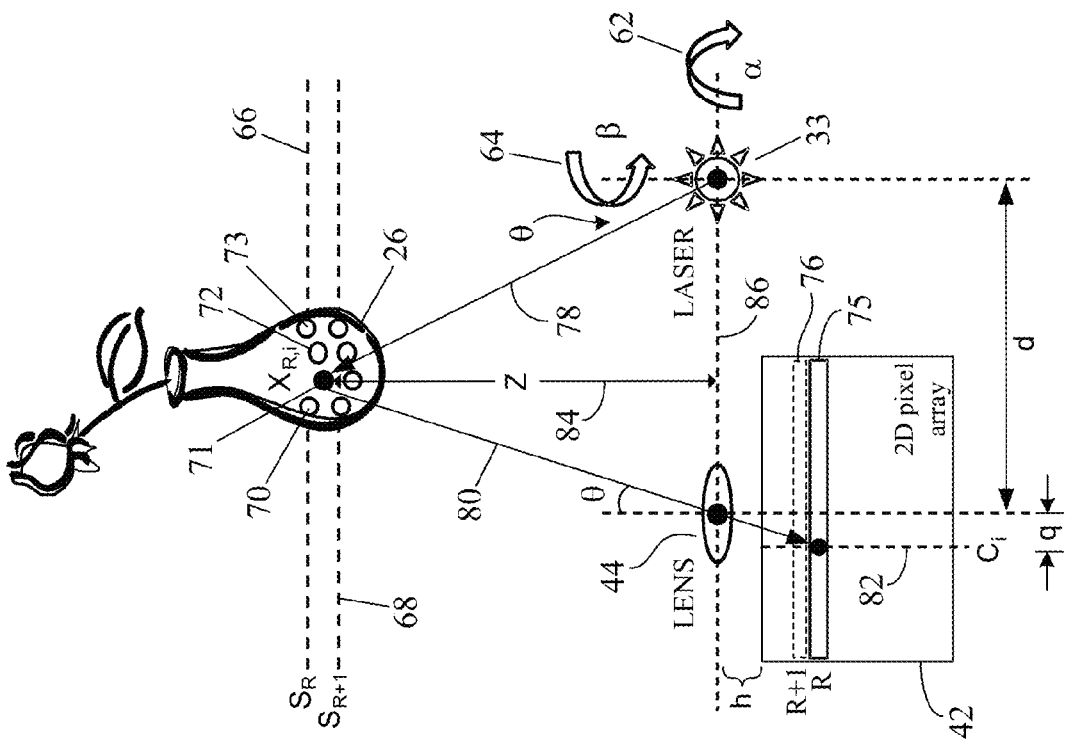
FIG. 4 is an exemplary illustration of how a point scan may be performed for 3D depth measurements according to one embodiment of the present disclosure.

FIG. 4 is an exemplary illustration of how a point scan may be performed for 3D depth measurements according to one embodiment of the present disclosure. In FIG. 4, the X-Y rotational capabilities of the laser source 33 are illustrated using the arrows 62, 64 depicting the laser's angular motions in the X-direction (having angle "β") and in the Y-direction (having angle "α"). In one embodiment, the laser controller 34 may control the X-Y rotation of the laser source 33 based on scanning instructions/input received from the processor 19. For example, when the user selects 3D imaging mode, the processor 19 may instruct the laser controller 34 to initiate 3D depth measurements of the object surface facing the projection optics 35. In response, the laser controller 34 may initiate a 1D X-Y point scan of the object surface through X-Y movement of the laser light source 33. As shown in FIG. 4, the laser 33 may point scan the surface of the object 26 by projecting light spots along 1D horizontal scanning lines—two of which $S_R$ 66 and $S_{R+1}$ 68 are identified by dotted lines in FIG. 4. Because of the curvature of the surface of the object 26, the light spots 70-73 may form the scanning line $S_R$ 66 in FIG. 4. For ease of illustration and clarity, the light spots constituting the scan line $S_{R+1}$ 68 are not identified using reference numerals. The laser 33 may scan the object 26 along rows R, R+1, and so on, one spot at a time—for example, in the left-to-right direction. The values of "R", "R+1", and so on, are with reference to rows of pixels in the 2D pixel array 42 and, hence, these values are known. For example, in the 2D pixel array 42 in FIG. 4, the pixel row "R" is identified using reference numeral "75" and the row "R+1" is identified using reference numeral "76." It is understood that rows "R" and "R+1" are selected from the plurality of rows of pixels for illustrative purpose only.

The plane containing the rows of pixels in the 2D pixel array 42 may be called the image plane, whereas the plane containing the scanning lines, like the lines $S_R$ and $S_{R+1}$, may be called the scanning plane. In the embodiment of FIG. 4, the image plane and the scanning plane are oriented using epipolar geometry such that each row of pixels R, R+1, and so on, in the 2D pixel array 42 forms an epipolar line of the corresponding scanning line $S_R$, $S_{R+1}$, and so on. A row of pixels "R" may be considered epipolar to a corresponding scanning line "$S_R$" when a projection of an illuminated spot (in the scanning line) onto the image plane may form a distinct spot along a line that is the row "R" itself. For example, in FIG. 4, the arrow 78 illustrates the illumination of the light spot 71 by the laser 33, whereas the arrow 80 shows that the light spot 71 is being imaged or projected along the row "R" 75 by the focusing lens 44. Although not shown in FIG. 4, it is observed that all of the light spots 70-73 will be imaged by corresponding pixels in the row "R." Thus, in one embodiment, the physical arrangement, such as the position and orientation, of the laser 33 and the pixel array 42 may be such that illuminated light spots in a scanning line on the surface of the object 26 may be captured or detected by pixels in a corresponding row in the pixel array 42—that row of pixels thus forming an epipolar line of the scanning line. Although not shown in FIG. 4 (but discussed later with reference to FIGS. 9-14), it is observed here that, in particular embodiments, a scanning line—such as the scanning line $S_R$—may not be perfectly straight, but may be curved or slanted. Such not-so-perfect laser scan lines also may result, for example, when there is a misalignment between the laser 33 and the pixel array 42. The misalignment may be due to limitations on mechanical/physical tolerances of various parts assembled in the system 15 or due to any discrepancy in the arrangement or final assembly of these parts. In case of a curved/slanted scanning line, two or more rows of pixels (in the pixel array 42) may collectively form an epipolar line of the curved scanning line. In other words, in particular embodiments, a single row of pixels may only form a portion of the epipolar line. In any event, the teachings of the present disclosure remain applicable regardless of whether a single row or a group of rows of pixels in the image plane forms an epipolar line of a corresponding scanning line. However, for ease of explanation and without the loss of generality, the discussion of FIGS. 3-8 may primarily refer to the configuration in which a single row of pixels forms an entire epipolar line. More details for the case of multiple rows of pixels forming different portions of an epipolar line are provided later with reference to FIGS. 9-14.

It is understood that the pixels in the 2D pixel array 42 may be arranged in rows and columns. An illuminated light spot may be referenced by its corresponding row and column in the pixel array 42. For example, in FIG. 4, the light spot 71 in the scanning line $S_R$ is designated as "$X_{R,i}$"

to indicate that the spot 71 may be imaged by row "R" and column "i" ($C_i$) in the pixel array 42. The column $C_i$ is indicated by dotted line 82. Other illuminated spots may be similarly identified. As noted before, it may be possible that light reflected from two or more lights spots may be received by a single pixel in a row, or, alternatively, light reflected from a single light spot may be received by more than one pixel in a row of pixels. The timestamp-based approach discussed later may remove the ambiguities in depth calculations arising from such multiple or overlapping projections.

In the illustration of FIG. 4, the arrow having reference numeral "84" represents the depth or distance "Z" (along the Z-axis) of the light spot 71 from the X-axis along the front of the device 15—such as the X-axis shown in FIG. 2. In FIG. 4, a dotted line having the reference numeral "86" represents such axis, which may be visualized as being contained in a vertical plane that also contains the projection optics 35 and the collection optics 44. However, for ease of explanation of the triangulation method, the laser source 33 is shown in FIG. 4 as being on the X-axis 86 instead of the projection optics 35. In a triangulation-based approach, the value of "Z" may be determined using the following equation:

$$Z = \frac{hd}{q - h \tan \theta} \quad (1)$$

The parameters mentioned in the above equation (1) are also shown in FIG. 4. Based on the physical configuration of the device 15, the values for the parameters on the right-hand side of equation (1) may be pre-determined. In equation (1), the parameter "h" is the distance (along the Z-axis) between the collection optics 44 and the image sensor (which is assumed to be in a vertical plane behind the collection optics 44); the parameter "d" is the offset distance between the light source 33 and the collection optics 44 associated with the image sensor 24; the parameter "q" is the offset distance between the collection optics 44 and a pixel that detects the corresponding light spot—here, the detecting/imaging pixel "i" is represented by column $C_i$ associated with the light spot $X_{R,i}$ 71; and the parameter "θ" is the scan angle or beam angle of the light source for the light spot under consideration—here, the light spot 71. Alternatively, the parameter "q" may also be considered as the offset of the light spot within the field of view of the pixel array 42.

It is seen from equation (1) that only the parameters "θ" and "q" are variable for a given point scan; the other parameters "h" and "d" are essentially fixed due to the physical geometry of the device 15. Because the row "R" 75 is at least a portion of an epipolar line of the scanning line $S_R$, the depth difference or depth profile of the object 26 may be reflected by the image shift in the horizontal direction—as represented by the values of the parameter "q" for different lights spots being imaged. As discussed later below, the time-stamp based approach according to particular embodiments of the present disclosure may be used to find the correspondence between the pixel location of a captured light spot and the corresponding scan angle of the laser source 33. In other words, a timestamp may represent an association between the values of parameters "q" and "θ". Thus, from the known value of the scan angle "θ" and the corresponding location of the imaged light spot (as represented by the parameter "q"), the distance to that light spot may be determined using the triangulation equation (1).

It is observed here that usage of triangulation for distance measurements is described in the relevant literature including, for example, the United States Patent Application Publication No. US 2011/0102763 to Brown et al. The discussion in the Brown publication related to triangulation-based distance measurement is incorporated herein by reference in its entirety.

Figure 5:
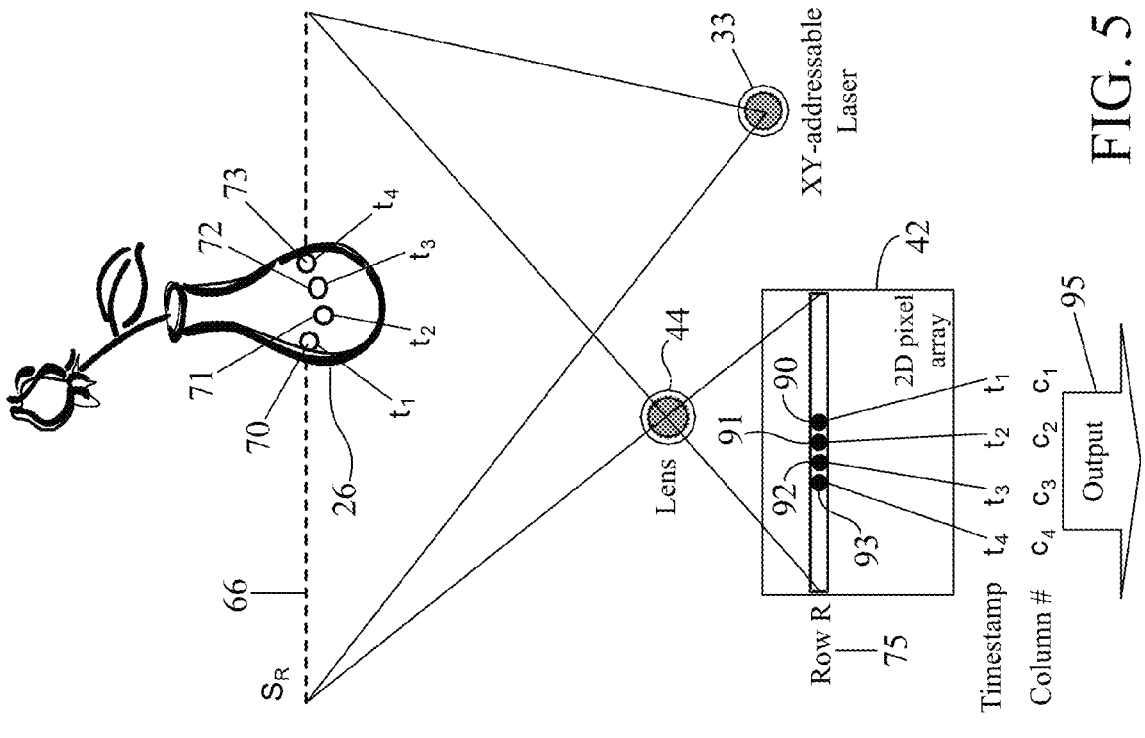
FIG. 5 illustrates an exemplary time-stamping for scanned light spots according to one embodiment of the present disclosure.

FIG. 5 illustrates an exemplary time-stamping for scanned light spots according to one embodiment of the present disclosure. Additional details of generation of individual timestamps are provided later such as, for example, with reference to discussion of FIG. 8. In contrast to FIG. 4, in the embodiment of FIG. 5, the collection optics 44 and the laser 33 are shown in an offset arrangement to reflect the actual physical geometry of these components as shown in the embodiment of FIG. 2. By way of an example, the scanning line 66 is shown in FIG. 5 along with corresponding light spots 70-73, which, as mentioned before, may be projected based on a left-to-right point scan of the object surface by the sparse laser point source 33. Thus, as shown, the first light spot 70 may be projected at time instant "$t_1$," the second light spot 71 may be projected at time instant "$t_2$," and so on. These light spots may be detected/imaged by respective pixels 90-93 in the pixel row "R" 75—which is an epipolar line of the scanning line $S_R$ as discussed earlier. In one embodiment, the charge collected by each pixel when detecting a light spot may be in the form of an analog voltage, which may be output to the image processing unit 46 for pixel-specific depth determination as discussed below. The analog pixel outputs (pixouts) are collectively indicated by arrow 95 in FIG. 5.

As shown in FIG. 5, each detecting pixel 90-93 in row R may have an associated column number—here, columns $C_1$ through $C_4$. Furthermore, it is seen from FIG. 4 that each pixel column $C_i$ (i=1, 2, 3, and so on) has an associated value for the parameter "q" in equation (1). Thus, when a pixel-specific timestamp $t_1$-$t_4$ is generated for the detecting pixels 90-93 (as discussed in more detail later below), the timestamp may provide an indication of the pixel's column number and, hence, the pixel-specific value of the parameter "q." Additionally, in one embodiment, the spot-by-spot detection using pixels in the pixel array 42 may allow the image processing unit 46 to "link" each timestamp with the corresponding illuminated spot and, hence, with the spot-specific scan angle "θ"—because the laser 33 may be suitably controlled to illuminate each spot in the desired sequence with pre-determined values for spot-specific scan angles "θ". Thus, timestamps provide correspondence between the pixel location of a captured laser spot and its respective scan angle—in the form of the values for parameters "q" and "θ" in equation (1) for each pixel-specific signal received from the pixel array 42. As discussed before, the values of the scan angle and the corresponding location of the detected spot in the pixel array 42—as reflected through the value of the parameter "q" in equation (1)—may allow depth determination for that light spot. In this manner, the 3D depth map for the surface of the object 26 in the field of view of the pixel array 42 may be generated.

FIG. 6 shows exemplary circuit details of the 2D pixel array 42 and a portion of the associated processing circuits in the image processing unit 46 of the image sensor 24 in FIGS. 1-2 according to one embodiment of the present disclosure. As noted before, the pixel array 42 is shown having nine pixels 100-108 arranged as a 3×3 array for ease of illustration only; in practice, a pixel array may contain hundreds of thousands or millions of pixels in multiple rows and columns. In one embodiment, each pixel 100-108 may have an identical configuration as shown in FIG. 6. In the embodiment of FIG. 6, the 2D pixel array 42 is a Complementary Metal Oxide Semiconductor (CMOS) array in which each pixel is a Four Transistor Pinned Photo-diode (4T PPD) pixel. For ease of illustration, the constituent circuit elements of only pixel 108 are labeled with reference numerals. The following discussion of the operation of the pixel 108 equally applies to the other pixels 101-107 and, hence, the operation of each individual pixel is not described herein.

As shown, the 4T PPD pixel 108 (and similar other pixels 101-107) may comprise a pinned photo-diode (PPD) 110 and four N-channel Metal Oxide Semiconductor Field Effect Transistors (NMOS) 111-114 connected as illustrated. In some embodiments, the pixels 100-108 may be formed of P-channel Metal Oxide Semiconductor Field Effect Transistors (PMOS) or other different types of charge transfer devices. The transistor 111 may operate as a Transfer Gate (TG), Floating Diffusion (FD) transistor. Broadly, the 4T PPD pixel 108 may operate as follows: First, the PPD 110 may convert the incident photons into electrons, thereby converting the optical input signal into an electrical signal in the charge domain. Then, the transfer gate 111 may be "closed" to transfer all the photon-generated electrons from the PPD 110 to the floating diffusion. The signal in the charge domain thus gets converted to the voltage domain for ease of subsequent processing and measurements. The voltage at the floating diffusion may be later transferred as a pixout signal to an Analog-to-Digital Converter (ADC) using the transistor 114 and converted into an appropriate digital signal for subsequent processing. More details of the pixel output (PIXOUT) generation and processing are provided below with reference to discussion of FIG. 8.

In the embodiment of FIG. 6, a row decoder/driver 116 in the image processing unit 46 is shown to provide three different signals to control the operation of the pixels in the pixel array 42 to generate the column-specific pixout signals 117-119. In the embodiment of FIG. 5, the output 95 may collectively represent such PIXOUT signals 117-119. A Row Select (RSEL) signal may be asserted to select an appropriate row of pixels. In one embodiment, the row to be selected is the epipolar line of the current scanning line (of light spots) being projected by the laser source 33. The row decoder/driver 116 may receive the address or control information for the row to be selected via the row address/control inputs 126, for example, from the processor 19. In the present discussion, it is assumed that the row decoder/driver 116 selects the row of pixels containing the pixel 108. A transistor, such as the transistor 114, in each row of pixels in the pixel array 42 may be connected to a respective RSEL line 122-124 as shown. A Reset (RST) signal may be applied to pixels in the selected row to reset those pixels to a pre-determined high voltage level. Each row-specific RST signal 128-130 is shown in FIG. 6 and explained in more detail with reference to the waveforms in FIG. 8. A transistor, such as the transistor 112, in each pixel may receive the respective RST signal as shown. A Transfer (TX) signal may be asserted to initiate transfer of the pixel-specific output voltage (PIXOUT) for subsequent processing. Each row-specific TX line 132-134 is shown in FIG. 6. A transfer-gate transistor, such as the transistor 111, may receive the respective TX signal as illustrated in FIG. 6.

As mentioned before, in particular embodiments of the present disclosure, the 2D array 42 and the rest of the rest of the components in the image sensor unit 24 may be used for 2D RGB (or non-RGB) imaging as well as for 3D depth measurements. Consequently, as shown in FIG. 6, the image sensor unit 24 may include a pixel column unit 138 that includes circuits for Correlated Double Sampling (CDS) as well as column-specific ADCs—one ADC per column of pixels—to be used during 2D and 3D imaging. The pixel column unit 138 may receive the PIXOUT signals 117-119 and process them to generate a digital data output (Dout) signal 140 from which 2D image may be generated or 3D depth measurements can be obtained. The pixel column unit 138 may also receive a reference input 142 and a ramp input 143 during processing of the PIXOUT signals 117-119. More details of the operation of the unit 138 are provided later below. In the embodiment of FIG. 6, a column decoder unit 145 is shown coupled to the pixel column unit 138. The column decoder 145 may receive a column address/control input 147, for example, from the processor 19, for the column to be selected in conjunction with a given row select (RSEL) signal. The column selection may be sequential, thereby allowing sequential reception of the pixel output from each pixel in the row selected by the corresponding RSEL signal. The processor 19 may be aware of the currently-projected scanning line of light spots and, hence, may provide appropriate row address inputs to select the row of pixels that forms the epipolar line of the current scanning line and may also provide appropriate column address inputs to enable the pixel column unit 138 to receive outputs from the individual pixels in the selected row.

It is observed here that although the discussion herein primarily focuses on the 4T PPD pixel design shown in FIG. 6 for 2D and 3D imaging according to teachings of the present disclosure, different types of pixels may be used in the pixel array 42 in other embodiments. For example, in one embodiment, each pixel in the pixel array 42 may be a 3T pixel, which omits the transfer gate transistor—like the transistor 111 in the 4T PPD design in FIG. 6. In other embodiments, 1T pixels or 2T pixels may be used as well. In yet another embodiment, each pixel in the pixel array 42 may have a shared-transistor pixel configuration, where transistors and readout circuitry can be shared among two or more neighboring pixels. In the shared-transistor pixel configuration, each pixel may have at least one photo-diode and one transfer-gate transistor; the rest of the transistors can be shared among two or more pixels. One example of such a shared-transistor pixel is the 2-shared (1×2) 2.5T pixel where five transistors (T) are used for two pixels, resulting in a 2.5T/pixel configuration. Another example of a shared-transistor pixel that may be used in the pixel array 42 is the 1×4 4-shared pixel, in which 4 pixels share the readout circuitry, but each one has at least one photo-diode and one TX (transfer-gate) transistor. Other pixel configurations than those listed here may be suitably implemented for 2D and 3D imaging as per teachings of the present disclosure.

FIG. 7A is an exemplary layout of an image sensor unit, such as the image sensor unit 24 in FIG. 6, according to one embodiment of the present disclosure. For the sake of brevity, only a brief discussion of the architecture in FIG. 7A is provided herein; more relevant operational details are provided later with reference to FIGS. 8 and 10-14. In the embodiment of FIG. 7A, various component blocks other than the 2D pixel array 42 may form a part of the pixel control unit 46 in FIG. 2. As shown, the image sensor unit 24 in FIG. 7A may include a row decoder unit 149 and a row driver unit 150, both of which collectively comprise the row decoder/driver 116 in FIG. 6. Although not shown in FIG. 7A, the row decoder unit 149 may receive a row address input (like the input 126 shown in FIG. 6), for example, from the processor 19, and decode the input to enable the row driver unit 150 to provide appropriate RSEL, RST, and TX signals to the row selected/decoded by the row decoder 149. The row driver unit 150 may also receive control signals (not shown), for example, from the processor 19, to configure the row driver 150 to apply appropriate voltage levels for the RSEL, RST, and TX signals. In the image sensor 24 in FIG. 7A, a column ADC unit 153 may represent the pixel column unit 138 in FIG. 6. For ease of illustration, in FIG. 7A, various row-specific driver signals—such as the RSEL, RST, and TX signals—from the row driver 150 are collectively referenced using a single reference numeral "155." Similarly, all column-specific pixel outputs (pixouts)—like the pixouts 117-119 in FIG. 6—are collectively referenced using a single reference numeral "157." The column ADC unit 153 may receive the pixout signals 157 and the reference input 142 (from a reference signal generator 159) and the ramp signal 143 to generate a pixel-specific output by the corresponding column-specific ADC for the pixel's column. The 3D imaging is discussed in more detail later with reference to FIG. 8. In one embodiment, the ADC unit 153 may include circuitry for CDS—as in case of the pixel column unit 138 in FIG. 6—to generate a CDS output (not shown) that is the difference between the pixel's reset level and the received signal level. In particular embodiments, the 3D depth values may be combined with the 2D image to generate a 3D image of the object.

The column ADC unit 153 may include a separate ADC per pixel column in the 2D array 42. Each column-specific ADC may receive a respective ramp input 143 (from a ramp signal generator 163) along with the pixout signals 157. In one embodiment, the ramp signal generator 163 may generate the ramp input 143 based on the reference voltage level received from the reference signal generator 159. Each column-specific ADC in the ADC unit 153 may process the received inputs to generate the corresponding digital data output (Dout) signal 140. From the column decoder 145, the ADC unit 153 may receive information about which column ADC output to be readout and sent to the Dout bus 140, and may also receive information about which column to select for a given row to receive the appropriate pixel output. Although not shown in FIG. 7A, the column decoder unit 145 may receive a column address input (like the input 147 in FIG. 6), for example, from the processor 19, and decode the input to enable the column ADC unit 153 to select the appropriate pixel column. In the embodiment of FIG. 7A, the decoded column address signals are collectively identified using the reference numeral "165."

The digital data outputs 140 from the ADC units may be processed by a digital processing block 167. In one embodiment, for the 2D RGB imaging mode, each ADC-specific data output 140 may be a multi-bit digital value that substantially corresponds to the actual photon charge collected by the respective pixel. On the other hand, in the 3D depth measurement mode, each ADC-specific data output 140 may be a timestamp value representing the time instant when the respective pixel detects its corresponding light spot. This timestamping approach according to the teachings of the present disclosure is discussed later in more detail. The digital processing block 167 may include circuits to provide timing generation; Image Signal Processing (ISP) such as, for example, processing of data outputs 140 for the 2D imaging mode; depth calculations for the 3D imaging mode; and so on. In that regard, the digital processing block 167 may be coupled to an interface unit 168 to provide the processed data as an output 170, for example, to enable the processor 19 to render a 2D RGB/non-RGB image or a 3D depth image of the 3D object 26 on a display screen (not shown) of the device 15. The interface unit 168 may include a Phase-Locked Loop (PLL) unit for generation of clock signals that support the timing generation functionality in the digital processing block 167. Furthermore, the interface unit 168 may also include a Mobile Industry Processor Interface (MIPI) that provides an industry-standard hardware and software interface to other components or circuit elements in the device 15 for the data generated by the digital block 167. The MIPI specifications support a broad range of mobile products and provide specifications for a mobile device's camera, display screen, power management, battery interface, and the like. The MIPI-standardized interfaces may yield an improved operability between a mobile device's peripherals—such as a smartphone's camera or display screen—and the mobile device's application processor(s), which may not be from the same vendor as the vendor (or vendors) providing the peripherals.

In the embodiment of FIG. 7A, a timestamp calibration unit 171 is shown coupled to the column ADC unit 153 to provide appropriate calibration signals 172 to individual column-specific ADCs to enable each column-specific ADC unit to generate an output representing a pixel-specific timestamp value in the 3D measurement mode. Although not shown in FIG. 7A, it is understood that, in particular embodiments, the calibration unit 171 may be coupled to the digital block 167 as well for timestamp calibration related processing support. The timestamping approach is discussed in more detail with reference to FIG. 8.

FIG. 7B shows architectural details of an exemplary CDS+ADC unit 175 for 3D depth measurement according to one embodiment of the present disclosure. For ease of discussion, the unit 175 may be referred below to as "ADC unit," however, it is understood that the unit 175 may also include CDS functionality in addition to the ADC functionality. In FIG. 7B, the capacitor 176 represents a simplified version of a CDS unit. In one embodiment, each column of pixels in the 2D pixel array 42 may have a column-specific, single slope ADC unit similar to the ADC unit 175. In other words, in the embodiment of FIG. 6, each pixel in a given column may share the same ADC unit, like the ADC unit 175. Thus, in the embodiment of FIG. 6, there may be three ADC units in the pixel column unit 138—one ADC per column. In particular embodiments, the column-specific ADC units 175 may be part of the column ADC unit 153 in FIG. 7A. In certain embodiments, such as the embodiments in FIGS. 10 and 14, there may be more than one column-specific ADC unit—similar to the ADC unit 175—per column of pixels in the pixel array 42, as discussed in more detail later below. As shown, the ADC 175 in the embodiment of FIG. 7B may include two Operational Transconductance Amplifiers (OTA) 177, 179, connected in series with a binary counter 181 and a line memory unit 183. For ease of illustration, only the inverting (−) and non-inverting (+) voltage inputs to the OTAs 177, 179 are shown in FIG. 7B; the biasing inputs and the power supply connections are not shown. It is understood that an OTA is an amplifier whose differential input voltage produces an output current. Thus, an OTA may be considered as a voltage-controlled current source. The biasing inputs may be used to provide currents or voltages to control the amplifier's transconductance. The first OTA 177 may receive—from the CDS unit 176—a CDS version of the pixout voltage from a pixel, such as the pixel 108 in FIG. 6, that is selected in the activated row using the column number received from the column decoder 145. The CDS version of a pixout signal may be referred to as a "PIX_CDS" signal. The OTA 177 may also receive a Vramp voltage 143 from the ramp signal generator 163 (FIG. 7A). The OTA 177 may generate an output current when the pixout voltage 157 drops below the Vramp voltage 143, as discussed below with reference to FIG. 8. The output of the OTA 177 may be filtered by the second OTA 179 before being applied to the binary counter 181. In one embodiment, the binary counter 181 may be a 10-bit ripple counter that receives a Clock (Clk) input 185 and generates a timestamp value 186 based on the clock cycles counted during a pre-determined time triggered by the generation of the output current by the first OTA 177. In the context of the embodiment in FIG. 7B, the Clk input 185 may be a system-wide clock or an image sensor-specific clock generated by the PLL unit 168 or other clock generator (not shown) in the device 15. The pixel-specific timestamp value 186 may be stored in the line memory 183 against the column number (column #) of the pixel, and subsequently output to the digital processing block 167 as the Dout signal 140. The column number input 165 may be received from the column decoder unit 145 shown in FIG. 7A.

In particular embodiments, the RGB color model may be used for sensing, representation, and display of images on mobile devices such as, for example, the device 15 in FIGS. 1-2. In the RGB color model, the light signals having three primary colors—red, green, and blue—may be added together in various ways to produce a broad array of colors in the final image. The CDS method may be used in 2D RGB imaging to measure an electrical value, such as a pixel/sensor output voltage, in a manner that allows removal of an undesired offset. For example, a CDS unit, like the CDS unit 176, may be employed in each column-specific ADC unit, like the ADC unit 175, to perform correlated double sampling. In CDS, the output of the pixel may be measured twice—once in a known condition, and once in an unknown condition. The value measured from the known condition may be then subtracted from the value measured from the unknown condition to generate a value with a known relation to the physical quantity being measured—here, the photoelectron charge representing the pixel-specific portion of the image signal. Using CDS, noise may be reduced by removing the reference voltage of the pixel (such as, for example, the pixel's voltage after it is reset) from the signal voltage of the pixel at the end of each integration period. Thus, in CDS, before the charge of a pixel is transferred as an output, the reset value is sampled. The reference value is "deducted" from the value after the charge of the pixel is transferred.

It is observed here that, in particular embodiments, the ADC unit 175 may be used for both—2D imaging as well as 3D depth measurements. All the inputs for such shared configuration, however, are not shown in FIG. 7B. In the shared use case, the corresponding Vramp signal may be different as well for 2D imaging.

Figure 8:
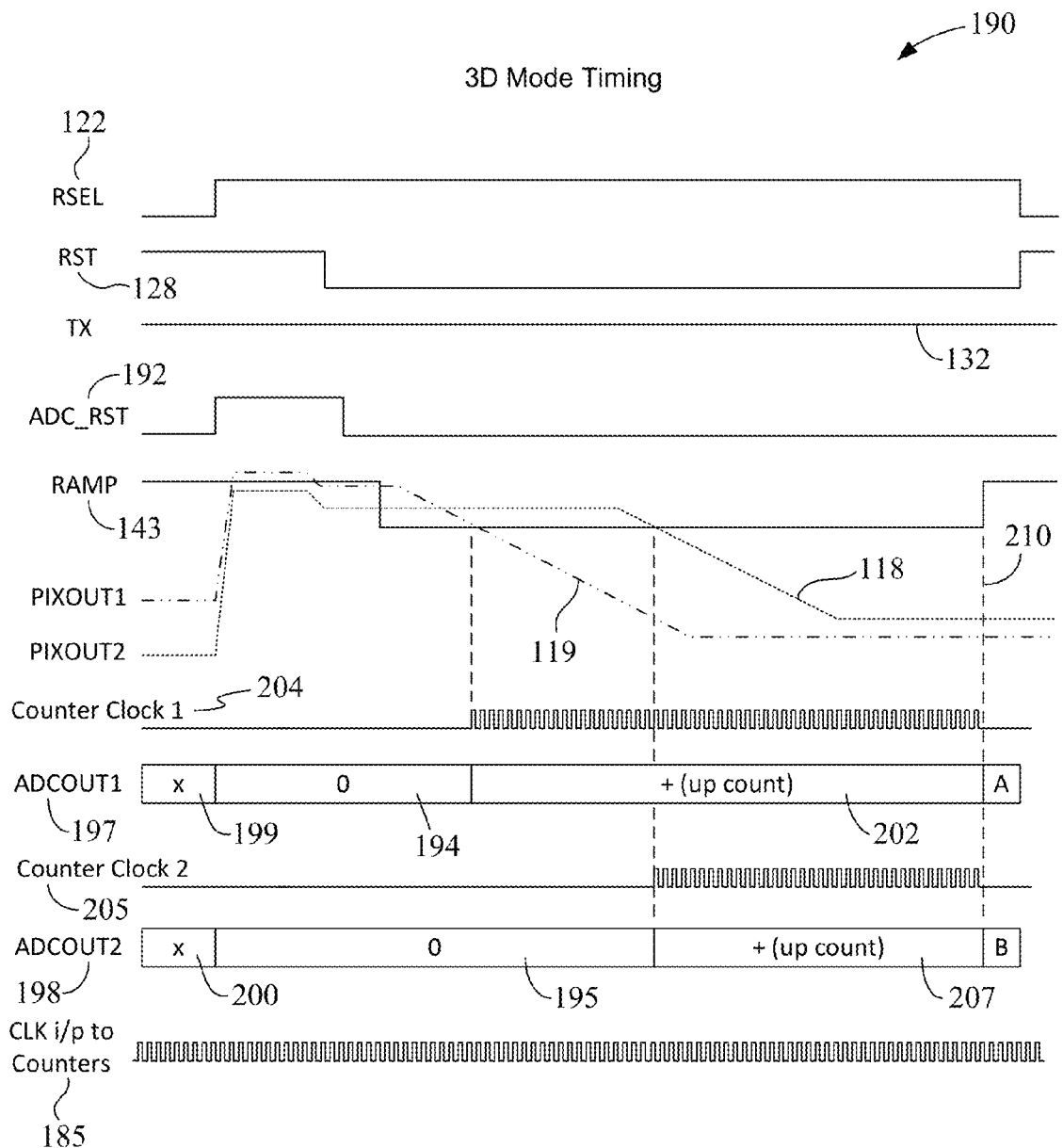
FIG. 8 is a timing diagram that shows exemplary timing of different signals in the system of FIGS. 1-2 to generate timestamp-based pixel-specific outputs in a 3D mode of operation according to particular embodiments of the present disclosure.

FIG. 8 is a timing diagram 190 that shows exemplary timing of different signals in the system 15 of FIGS. 1-2 to generate timestamp-based pixel-specific outputs in a 3D mode of operation according to particular embodiments of the present disclosure. As noted before, in particular embodiments, all pixels in the same image sensor 24 may be used for 2D as well as 3D imaging.

Briefly, as discussed earlier with reference to FIGS. 4-5, the 3D object 26 may be point-scanned—one spot at a time—by the laser light source 33 along a row "R" 75 of the pixel array 42, where "R" is known based on its epipolar relation with the scanning line $S_R$ 66. After scanning one row, the scanning operation repeats with another row. When the laser projects the next spot, the earlier-projected light spot may be imaged by the corresponding pixel in the row R. The pixel-specific outputs from all the pixels in the row R may be read out to the depth processing circuit/module in the digital processing block 167 (FIG. 7A).

To generate a pixel-specific output, the corresponding row may have to be initially selected using an RSEL signal. In the context of FIG. 8, it is assumed that the row decoder/driver 116 in FIG. 6 selects the row of pixels containing pixels 106-108 by asserting the RSEL signal 122 to a "high" level as shown in FIG. 8. Thus, all the pixels 106-108 are selected together. For ease of discussion, the same reference numerals are used in FIG. 8 for the signals, inputs, or outputs that are also shown in FIGS. 6-7. Initially, all the pixels 106-108 in the selected row may be reset to a high voltage using the RST line 128. The "reset" level of a pixel may represent an absence of the pixel-specific detection of a corresponding light spot. In the 3D mode according to one embodiment of the present disclosure, the RST signal 128 may be released from its high level for a pre-determined time to facilitate integration of photoelectrons received by the pixels 106-108, so as to obtain the corresponding pixel output (pixout) signals 117-119—two of which are shown in FIG. 8 and discussed later below. The PIXOUT1 signal 119 represents the output supplied to a corresponding ADC unit by the pixel 108, and is shown using a dashed line having the pattern "- •• - •• -". The PIXOUT2 signal 118 represents the output supplied to a corresponding ADC unit by the pixel 107, and is shown using a dashed line having the pattern "••••••••••••••". It is noted here that, in one embodiment, other RST lines—like the lines 129-130 in FIG. 6—may remain high or "on" for unselected rows to prevent blooming. It is noted here that, strictly speaking, the PIXOUT signals 118-119 in FIG. 8 may be slightly modified by a CDS unit—such as, for example, the CDS unit 176 in FIG. 7B—before being applied as PIX_CDS signals to the first OTA—like the OTA 177 in FIG. 7B—in a respective column-specific ADC unit, such as the ADC unit 175 in FIG. 7B. However, for the simplicity of illustration and ease of discussion, the PIXOUT signals in FIG. 8 are treated as representatives of respective PIX_CDS signals (not shown) and are considered as having been directly "input" to the respective OTAs 177.

After reset, when a photodiode in a pixel receives incident luminance—such as, for example, the photoelectrons in the light reflected from a light spot projected on the surface of the 3D object 26, the photodiode may generate corresponding photocurrent. A pixel's detection of incident light may be called an "ON event," whereas a decrease in the intensity of incident light may produce an "OFF event." The photocurrent generated in response to an ON event may decrease the pixel output voltage (PIXOUT) from its initial reset level. A pixel thus functions as a transducer to convert received luminance/light signal into a corresponding electrical (analog) voltage, which is generally designated as a PIXOUT signal in FIGS. 6-8. Each pixel may be read individually and, preferably, in the sequence in which the corresponding light spots are projected by the laser source. The analog pixout signal may be converted to a digital value by the corresponding column ADC. In the 2D imaging mode, the ADC may function as an analog-to-digital converter and generate a multi-bit output. However, as discussed below, in the 3D depth measurement mode, the ADC may function as a time-to-digital converter (TDC) and generate a timestamp value representing the time when a light spot is detected by a pixel.

Referring again to FIG. 8, after the pixel reset is done (with RST 128 high), the column ADCs associated with pixels 106-108 may be reset as well before the RST is released. However, the transfer (TX) signal 132 may remain high throughout. The ADCs may be reset using either a common ADC reset signal or individual ADC-specific reset signals. In the embodiment of FIG. 8, a common ADC_RST signal 192 is shown to have been briefly asserted (to a high level) to reset the column-specific ADCs—like the ADC 175—in the column ADC unit 153 (FIG. 7A). In one embodiment, the ADCs may be reset to a pre-determined binary value—such as a binary "0" or other known number—after the pixels are reset. In FIG. 8, these reset values for ADCs associated with pixels 108 and 107 are shown by "fields" 194-195 in the signals ADCOUT1 (or ADC output "A") and ADCOUT2 (or ADC output "B"), respectively. It is noted here that the term "field" is used here for the sake of convenience only when discussing the ADC outputs shown in FIG. 8. It is understood that an ADC output may not actually consist of all of such "fields" at the same time, but may be a specific digital value depending on the ADC's current stage of signal processing—if the ADC is reset, its output may be a binary "0"; if the ADC is triggered to count clock pulses, its output may be a count value as in case of the 3D depth measurements in FIG. 8; or if the ADC is used for 2D color imaging, then its output may be a multi-bit value representing an image signal. Thus, the ADC output signals in FIG. 8 are depicted with such "fields" merely to illustrate different digital values an ADC may internally generate in progressing toward the final output. In FIG. 8, the reference numeral "197" is used to refer to the ADCOUT1 signal representing the output of the ADC associated with the pixel 108, and the reference numeral "198" is used to refer to the ADCOUT2 signal representing the output of the ADC associated with the pixel 107. Each of the outputs 197-198 may appear as the Dout signal 140 (FIGS. 6-7) when the respective ADC is selected by the column decoder during memory readout. Prior to being reset, the ADC outputs 197-198 may have unknown values, as indicated by the notation "x" in the fields 199-200.

After ADCs are reset, a pre-determined threshold value may be enabled by de-asserting the ramp input (Vramp) 143 to a pre-defined voltage level after the pixel reset signal 128 and ADC reset signal 192 are released. In the embodiment of FIG. 8, the RAMP input 143 is common to all column-specific ADCs, thereby providing the same Vramp voltage to each ADC. However, in other embodiments, different Vramp values may be applied to two or more ADCs through separate, ADC-specific ramp inputs. Furthermore, in particular embodiments, the Vramp threshold may be a programmable parameter, allowing it to be variable as desired. After the threshold (RAMP signal) is enabled, the pixel-specific ADCs may wait for the corresponding pixel's "ON event" before starting their binary counters—like the counter 181 in FIG. 7B.

In the 3D depth measurement mode, each ADC may generate a single bit output (representing binary "0" or "1"), as opposed to a multi-bit output in case of the 2D imaging mode. Thus, in case of an RGB sensor, any color information received by a pixel in the RGB pixel array 42 may be effectively ignored in the 3D mode. In the absence of any incident light detected by a pixel, the corresponding ADCOUT signal may remain at the binary "0" value. Thus, columns without any ON events may continue to have digital value "0" (or other known number) for their respective ADCOUT signals. However, as noted before, when a pixel is hit with incident light, its PIXOUT line may start to droop from its reset level—as indicated by the downward slopes of the PIXOUT1 and PIXOUT2 signals in FIG. 8. Assuming that pixel charge is read starting with the pixel that receives the charge first, such a reading may start with the right-most pixel in a row and end with the left-most pixel as shown, for example, in FIG. 5, where "$t_1$" is the earliest time instant and "$t_4$" is the latest one. Thus, in the embodiment of FIG. 8, the output of the pixel 108 (PIXOUT1) may be read before that of the pixel 107 (PIXOUT2). As soon as the progressively-drooping PIXOUT1 reaches the Vramp threshold 143, the single-bit ADCOUT1 may flip from binary "0" to binary "1." However, instead of outputting the bit "1," the corresponding ADC may record the time when the bit flips (from "0" to "1"). In other words, the ADC associated with the pixel 108 may function as a time-to-digital converter, by starting the binary counter in the ADC, as indicated by the "up count" field 202 in ADCOUT1. During the "up count" period, the counter in the ADC may count the clock pulses in the CLK signal 185, which may be applied to each ADC as shown, for example, in FIG. 7B. The counted clock pulses are shown by the Counter Clock-1 signal 204 in FIG. 8, and the counted value (in the "up count" field) may be provided as a pixel-specific output for the pixel 108. A similar counting may occur at the ADC associated with pixel 107 for the charge collected by the pixel 107, as indicated by the Counter Clock-2 signal 205 in FIG. 8. The pixel-specific counted value (in the "up count" field 207) may be provided by the respective ADC as a pixel-specific output for the pixel 107. After scanning all pixels in one row, the pixel-by-pixel charge collection operation may repeat with another row, while the outputs from the earlier-scanned row are read out to the depth calculation unit in the digital block 167.

Each ADC output may effectively represent a respective "timestamp" value providing a temporal indication of a pixel's detection of a light spot on the object surface illuminated by the laser light source 33. A "timestamp" may be considered to capture the light arrival time for a pixel. In one embodiment, a timestamp value may be generated for a detected light spot by the digital processing block 167 from the count value (of the counted clock pulses) received from an ADC unit. For example, the digital block 167 may generate a timestamp by relating the count value to an internal system time or other reference time. The timestamp is generated at the receiving end and, hence, may not necessarily represent the exact time when the corresponding light spot was projected by the light source. However, the timestamp values may allow the digital block 167 to establish a temporal correlation among time-stamped light spots, thereby allowing the digital block 167 to determine distances to time-stamped light spots in the time-wise order specified by the temporal correlation—the distance to the earliest illuminated light spot being determined first, and so on, until the distance to the last-illuminated light spot is determined. In one embodiment, the timestamping approach may also facilitate resolution of the ambiguity that may arise from multiple light spots being imaged on the same pixel, as discussed later.

All ADC-based counters may stop simultaneously such as, for example, when the ramp signal 143 is asserted again after a pre-determined time period has elapsed. In FIG. 8, the transition of the ramp signal 143, marking the conclusion of the pre-determined time period for pixel charge integration, is indicated by dotted line 210. The RSEL 122 and the RST 128 signals may also transition their states substantially simultaneously with the change in the level of the ramp signal 143 (at line 210). It is observed here that, in one embodiment, all ADC-based counters may be reset at line 210. In another embodiment, all ADC-based counters may be reset at any time prior to the selection of the next row of pixels for reading the pixel charge. Despite resetting of ADC counters upon conclusion of scanning of pixels in one row, the timestamp value for each pixel in the pixel array 42 may remain distinct because of the relational establishment of the timestamp value against an internal system time or other reference source of time, which may remain global and continuously-running.

It is observed here that, in the embodiment of FIG. 8, a later-scanned pixel—such as the pixel 107—may have a smaller ADC output than the pixel that is scanned earlier—such as the pixel 108. Thus, as shown, the ADCOUT2 may have less count value (or less number of clock pulses counted) than the ADCOUT1. Alternatively, in another embodiment, a later-scanned pixel may have a larger ADC output than an earlier-scanned pixel, for example, when each ADC-specific counter starts counting when a pixel is reset and stops counting when an "ON event" is detected—such as, for example, when the pixel's pixout signal droops below a given threshold (Vramp).

It is noted here that circuits and waveforms shown in FIGS. 6-8 are based on single-slope ADCs with per column up-counters. However, it is understood that the time-stamping approach may be implemented with up- or down-counters depending on the design choice. Furthermore, single slope ADCs with global counters may be used as well. For example, in one embodiment, instead of using individual, column-based counters, a global counter (not shown) may be shared by all column ADCs. In that case, the ADCs may be configured such that the column memory—like the line memory 183 in FIG. 7B—in each ADC may latch the output of the global counter to generate an appropriate ADC-specific output when a column-based comparator unit (not shown) detects an "ON event" such as, for example, when it first senses the respective pixout signal drooping below the ramp threshold 143.

It is observed here that, when a row of light spots is scanned along the surface of the object, two or more different spots from the object scanned may be imaged on the same pixel. The spots may be in the same scanning line or may be on adjacent scanning lines. When multiple spots are scanned across the surface of the object, such overlapping imaging may negatively affect the correlation of the spots and the pixel ON events and, hence, may cause ambiguity in the depth measurements. For example, it is seen from the earlier-mentioned equation (1) that the depth measurement is related to the scan angle (θ) and the pixel location of the imaged light spot—as given by the parameter "q" in equation (1). Thus, if the scan angle is not correctly known for a given light spot, the depth calculation may be inaccurate. Similarly, if two or more light spots have the same value of "q", the depth calculations may become ambiguous as well. The time-stamp based approach according to particular embodiments of the present disclosure may be used to maintain the correct correlation between the pixel location of a captured light spot and the corresponding scan angle of the laser source. In other words, a timestamp may represent an association between the values of parameters "q" and "θ". Thus, if two spots land on the same pixel or column (from the data output point of view), the time-to-digital conversion in the timestamping approach may allow the imaging system—here, the digital processing block 167 (FIG. 7B)—to establish a temporal correlation between these two spots to identify which light spot was received first in time. Such correlation may not be easily possible in systems that do not use timestamping, such as, for example, the earlier-discussed stereo vision systems or the systems using the structured light approach. As a result, such systems may need to perform a lot of data searching and pixel-matching to solve the correspondence problem.

In one embodiment, when multiple light spots are imaged by the same pixel, timestamps of these light spots may be compared to identify the earliest-received light spot and the distance may be calculated for that light spot only, while ignoring all subsequently-received light spots at the same pixel. Thus, in this embodiment, the timestamp of the earliest-received light spot may be treated as the pixel-specific output for the corresponding pixel. Alternatively, in another embodiment, the distance may be calculated for the light spot that is received the last in time, while ignoring all other light spots imaged by the same pixel. In either case, any light spot received between the first or the last light spot may be ignored for depth calculations. Mathematically, the scan times of light spots projected by a light source may be given as $t(0), t(1), \ldots, t(n)$, where $t(i+1)-t(i)=d(t)$ (constant). The pixel/column outputs may be given as $a(0), a(1), \ldots, a(n)$, which are timestamps for the ON events and $a(i)$ is always after $t(i)$, but before $a(i+1)$. If $a(i)$ and $a(k)$ ($i \neq k$) happen to be associated with the same pixel/column, only one of them may be saved as discussed before to remove any ambiguity in depth calculations. Based on the time relationship between the scan time and the output time (represented by timestamps), the processing unit, such as the digital block 167, can figure out which output point(s) is missing. Although the processing unit may not be able to recover the missing location, the depth calculations from the available output points may suffice to provide an acceptable 3D depth profile of the object. It is noted here that, in one embodiment, it also may be possible for two different pixels to image a respective portion of the same light spot. In that embodiment, based on the closeness of the values of the timestamp outputs from these two pixels, the processing unit may infer that a single light spot may have been imaged by two different pixels. To resolve any ambiguity, the processing unit may use the timestamps to find an "average" of the respective location values "q", and use that average value of "q" in equation (1) to calculate the 3D depth for such "shared" light spot. The embodiments in FIGS. 9-14 discuss additional time-stamping mechanisms that may be used to address sensor-scanner misalignment issues in a 3D imaging system, such as the system 15 in FIG. 1. As discussed in more detail below, the embodiments in FIGS. 9-14 primarily relate to the situation in which a projected light spot is imaged by multiple adjacent pixels due to a potential misalignment between the laser source 33 and the 2D sensor 42, or due to the laser scanning line being not perfect—for example, the scanning line may be wider than one pixel in height, may have curvatures, and/or may be slanted.

It is observed from the foregoing discussion that the timestamp-based 3D depth measurement using triangulation according to particular embodiments of the present disclosure allows an ADC to be operated as a binary comparator with a low resolution of just a single bit, thereby consuming significantly less switching power in the ADC and, hence, conserving the system power. A high bit resolution ADC in traditional 3D sensors, on the other hand, may require more processing power. Furthermore, timestamp-based ambiguity resolution may also save system power in comparison with traditional imaging approaches that require significant processing power to search and match pixel data to resolve ambiguities. The latency is reduced as well because all depth measurements may be performed in one pass due to imaging/detection of all point-scanned light spots in a single imaging step. In particular embodiments, each pixel in the pixel array may be a single storage pixel and, hence, can be made as small as 1 micrometer (μm) in size. In a single storage pixel design, there may be only one photodiode and one junction capacitor per pixel (like the transistor 111 in FIG. 6) to integrate and store photoelectrons. On the other hand, a pixel that has one photodiode with multiple capacitors—to store photoelectrons coming at different times—may not be reduced to such a small size. Thus, the low-power 3D imaging system with small sensors as per particular embodiments of the present disclosure may facilitate its easy implementation in mobile applications such as, for example, in cameras in smartphones or tablets.

As mentioned before, the same image sensor—such as the image sensor unit 24 in FIGS. 1-2—may be used for both 2D imaging and 3D depth measurements according to one embodiment of the present disclosure. Such dual-mode image sensor may be, for example, part of a camera system on a mobile phone, smartphone, laptop computer, or tablet, or as part of a camera system in an industrial robot or VR equipment. In particular embodiments, there may be a mode switch on the device to allow a user to select between the traditional 2D camera mode or the 3D imaging mode using depth measurements as discussed before. In the traditional 2D camera mode, in particular embodiments, the user may capture color (RGB) images or snapshots of a scene or a particular 3D object within the scene. However, in the 3D mode, the user may be able to generate a 3D image of the object based on the camera system performing the point scan-based depth measurements in the manner discussed earlier. In either modes, the same image sensor may be used in its entirety to carry out the desired imaging. In other words, each pixel in the image sensor may be used for either application-2D or 3D imaging.

As noted before, a scanning line—such as the scanning line $S_R$ in FIGS. 4-5—may not be perfectly straight, but may be curved or slanted. Such not-so-perfect laser scan lines also may result, for example, when there is a misalignment between the laser 33 and the pixel array 42. The curved/slanted scanning line may be wider than one pixel in height in the image plane. In that case, two or more rows of pixels (in the pixel array 42) may collectively form an epipolar line of the curved scanning line. In other words, in particular embodiments, a single row of pixels may only form a portion of the epipolar line. As a result of such an imperfect scanning line, multiple pixels—in adjacent rows and/or adjacent columns—may image the same light spot. It is observed that, in certain embodiments, it may not be possible to physically solve the misalignment problem once a device is manufactured with that defect. Indeed, in particular embodiments, the cause of imperfect scanning lines may not be even relevant. Rather, the effect of this imperfection—that is, detection of the "wider" laser spots by multiple pixels—may be more relevant and, hence, it may be desirable to devise a modified time-stamping approach to take into account such "wider" laser spots to avoid confusion during 3D depth measurements and also to improve the performance of a 3D camera system employing epipolar line-based laser scanning. The embodiments in FIGS. 9-14 discuss various aspects of such a modified time-stamping approach.

Figure 9:
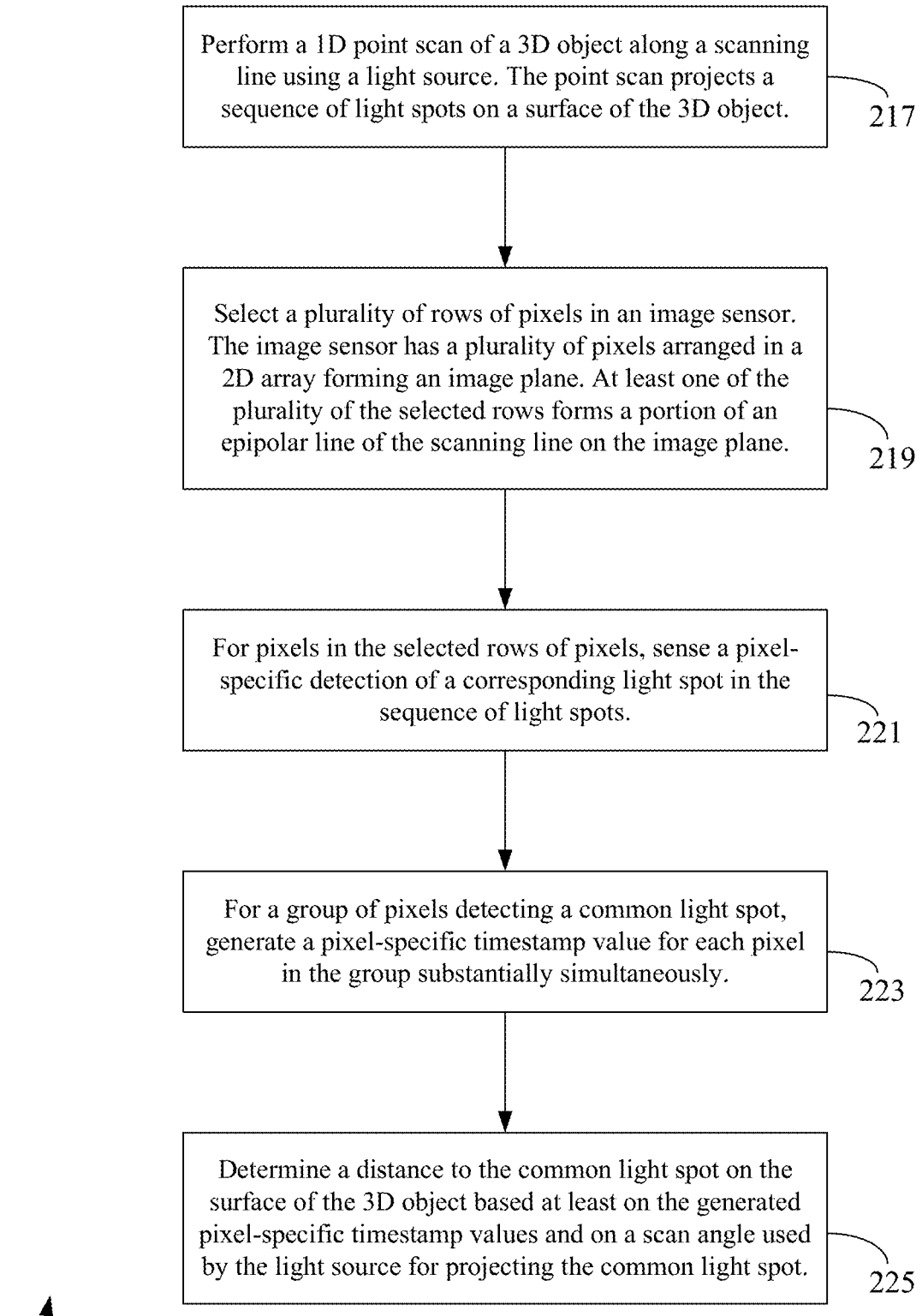
FIG. 9 shows an exemplary flowchart that illustrates how simultaneous timestamping may be used according to one embodiment of the present disclosure to address the situation where a common light spot is detected by multiple pixels during a 3D depth measurement.

FIG. 9 shows an exemplary flowchart 215 that illustrates how simultaneous timestamping may be used according to one embodiment of the present disclosure to address the situation where a common light spot is detected by multiple pixels during a 3D depth measurement. As in the embodiment of FIG. 3, various steps illustrated in FIG. 9 may be performed by a single module or a combination of modules or system components in the system 15. In the discussion herein, by way of an example only, specific tasks are described as being performed by specific modules or system components. Other modules or system components, however, may be suitably configured to perform such tasks as well. In the discussion of the embodiments of FIGS. 9-14, it is assumed that the scan lines may not be perfect and, hence, it may be desirable to improve the performance of the system 15 when scan lines are wider than one pixel in height or have curvature/slant.

In FIG. 9, the operation at block 217 is similar to that at block 52 in FIG. 3. In other words, at block 217 in FIG. 9, the system 15 (more specifically, the processor 19) may perform a 1D point scan of a 3D object, such as the object 26 in FIG. 2, along a scanning line using a light source, such as the light source module 22 in FIG. 2. As part of the point scan, the light source module 22 may be configured, for example, by the processor 19, to project a sequence of light spots on a surface of the 3D object 26 in a line-by-line manner. At block 219, the pixel processing unit 46 in the system 15 may select a plurality of rows of pixels in an image sensor, such as the 2D pixel array 42 in FIG. 2. The image sensor 42 has a plurality of pixels arranged in a 2D array forming an image plane, and, in one embodiment, at least one of the plurality of the selected rows of pixels forms a portion of an epipolar line of the scanning line (at block 217) on the image plane. As discussed in more detail later with reference to FIGS. 10 and 14, more than one row of pixels may need to be selected when the scan line is not imaged by a single row, but by pixels in multiple rows. As also discussed below, the selected rows may or may not be adjacent. At block 221, for pixels in the selected rows of pixels, the pixel processing unit 46 may be operatively configured by the processor 19 to sense a pixel-specific detection of a corresponding light spot in the sequence of light spots. As mentioned before, in one embodiment, such "sensing" may refer to activation of the pixel for collection of the charge generated by the sensor's photodiode when the photodiode detects luminance received from the corresponding light spot. The pixel-specific PIXOUT signal may represent such pixel-specific charge generated in response to received luminance. In particular embodiments, the "sensing" operation at block 221 may be performed substantially simultaneously for a group of pixels detecting a common light spot. The group of pixels, for example, may be in the same column of the selected rows or may be in adjacent columns. For the group of pixels detecting a common light spot, the pixel processing unit 46—as suitably configured by the processor 19—may generate a pixel-specific timestamp value for each pixel in the group substantially simultaneously, as noted at block 223. Consequently, at block 225, the image processing unit 46 may determine the 3D distance (or depth) to the common light spot on the surface of the 3D object based at least on the generated pixel-specific timestamp values (at block 223) and on a scan angle used by the light source for projecting the common light spot (at block 217). As noted before, a timestamp may provide the needed correspondence between the pixel location (q) of an imaged light spot and the corresponding scan angle (θ) of the laser source. These and other parameters used in equation (1) for a triangulation-based depth measurement are illustrated in FIG. 4.

Figure 10:
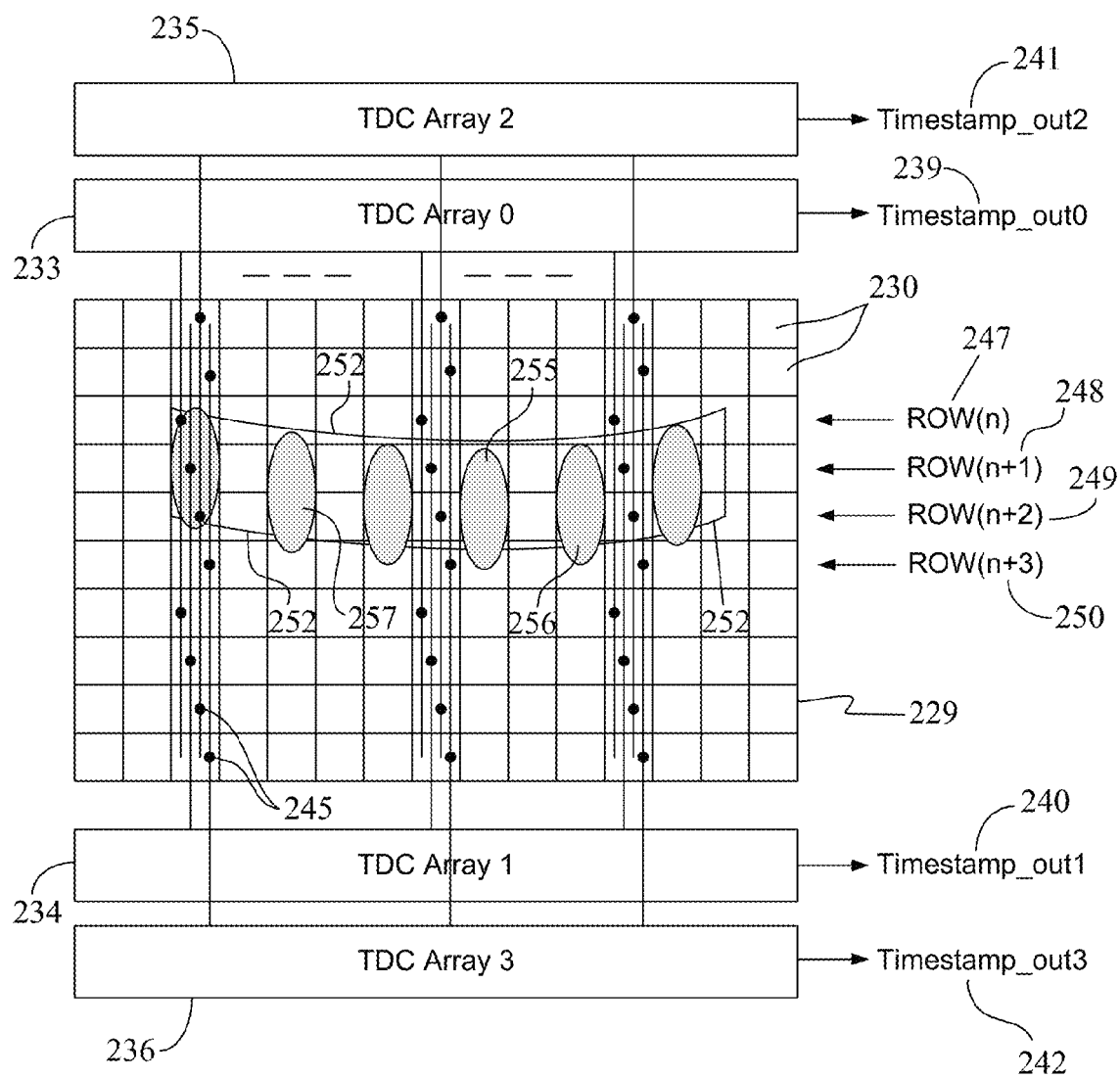
FIG. 10 is an exemplary layout showing how the simultaneous timestamping approach mentioned in the discussion of FIG. 9 may be implemented according to one embodiment of the present disclosure.

FIG. 10 is an exemplary layout 227 showing how the simultaneous timestamping approach mentioned in the discussion of FIG. 9 may be implemented according to one embodiment of the present disclosure. In FIG. 10, a 15×10 pixel array 229 is shown by way of an example. All of the pixels in the pixel array 229 are collectively identified using the single reference numeral "230." In one embodiment, the total number of pixels 230 may equal the number of pixels in the "active" portion of pixels in the 2D array 229. Here, it is assumed that the active portion of each row of pixels in the pixel array 229 contains the same number of pixels. The "active" portion may refer to those pixels which actually receive light from the object 26 during the laser scan and from which the corresponding PIXOUT signals are received and processed for 3D depth calculations. In the embodiment of FIG. 10, the pixel array 229 may represent the "active" portion of pixels.

It is understood that, in particular embodiments, the pixel array 229 may be the same as the 2D pixel array 42 in FIGS. 2 and 6, but used in the configuration shown in FIG. 10. Thus, like the embodiment in FIG. 6, each pixel 230 in FIG. 10 may be a 4T PPD pixel. However, in other embodiments, the pixels 230 may be of different types as well—such as 3T pixels, 2T pixels, having NMOS or PMOS transistors, and so on, as mentioned before with reference to the discussion of pixels in the embodiment of FIG. 6. The embodiments in FIGS. 11-12 (discussed later) depict an additional pixel configuration—a shared-pixel configuration—for the pixels 230.

In the embodiment of FIG. 10, the pixel array 229 is shown coupled to four Time-to-Digital Converter (TDC) arrays—TDC array 0 through TDC array 3, which are identified using reference numerals "233" through "236", respectively. As discussed before with reference to FIG. 7B, each column of pixels in the 2D pixel array 42 may be associated with a corresponding column-specific ADC unit 175. Furthermore, in the 3D depth measurement mode, the column-specific ADC unit 175 may function as a Time-to-Digital Converter (TDC) and generate a timestamp value representing the time when a light spot is detected by a pixel in the respective column. In contrast to the earlier discussion of one TDC unit per column of pixels, in the embodiment of FIG. 10, each column of pixels in the pixel array 229 may be associated with a total of four column-specific TDC units—each such TDC unit being part of the respective one of the TDC arrays 233-236. In particular embodiments, the circuit blocks 233-236 may be part of the pixel processing unit 46 (FIG. 2). More specifically, the TDC arrays 233-236 may be part of the column ADC unit 153 (FIG. 7A) in certain embodiments. For ease of illustration, only the relevant circuit details are shown in FIG. 10.

It is noted that each TDC array 233-236 may include "N" numbers of ADC (or TDC) units—each such ADC unit may be similar to the ADC unit 175 in FIG. 7B. In one embodiment, the number "N" may be equal to the number of pixel columns in the 2D pixel array 229. Each TDC unit within the respective TDC array 233-236 may generate a corresponding timestamp output in the same manner as discussed before with reference to the ADC unit 175 of FIG. 7B. All such timestamp outputs per respective TDC array are collectively identified using the reference numerals "239" through "242" in FIG. 10.

In the embodiment of FIG. 10, each pixel is shown to be coupled to one of the four TDC arrays 233-236. For ease of illustration, black dots are used to show such connection for a select number of pixels. However, it is understood that each pixel in the array 229 may be similarly connected. Two such black dots are collectively identified using the reference numeral "245." In one embodiment, each pixel in the same row may be coupled to the same TDC array, whereas pixels in adjacent rows may be coupled to different TDC arrays in an alternating manner. For example, as shown in FIG. 10, the pixels in row(n) 247 may be coupled to the TDC array 233, the pixels in row(n+1) 248 may be coupled to the TDC array 234, the pixels in row(n+2) 249 may be coupled to the TDC array 235, and the pixels in row(n+3) 250 may be coupled to the TDC array 236. Thus, each pixel in the pixel array 229 may be connected to its column-specific TDC/ADC unit within the respective TDC array for processing of the respective PIXOUT signal and generation of the corresponding timestamp value. The connection arrangement shown in FIG. 10 is exemplary only; other arrangements to connect pixels in the same column to different column-specific ADC units may be devised as well.

In the embodiment of FIG. 10, a misaligned and curved epipolar "line" 252 is shown to have a maximum "height" of four (4) pixels. In other words, in the image plane 229 in FIG. 10, the epipolar line 252 may be formed of four (4) rows of pixels—row(n) 247 through row(n+3) 250. As a result, at least one of these four rows 247-250 forms a portion of the epipolar line. Hence, in the embodiment of FIG. 10, four different TDC arrays 233-236 may be needed to capture timestamp values for the maximum number of rows—here, four—that may simultaneously detect a light spot due to the curved/slanted epipolar line 252. In other embodiments, more or less number of TDC arrays may be provided depending on how wide is each scanning line—as measured in terms of the pixel height of the corresponding epipolar line in the image plane. Some of the light spots detected by the group of rows 247-250 are shown using darkened ovals—three of such ovals are identified using reference numerals "255", "256", and "257" in FIG. 10. For ease of illustration, all the light spots in the epipolar line 252 are not shown or individually identified. In the embodiment of FIG. 10, each light spot is shown to "encompass" and hence be detected by multiple pixels within the same column of multiple adjacent rows. However, the teachings of the present disclosure remain applicable to other embodiments where a single light spot is imaged by multiple pixels in adjacent columns as well.

The epipolar line 252 may correspond to a scanning line (not shown in FIG. 10), such as the scanning line $S_R$ 66 in FIGS. 4-5. Ideally, a scanning line may be "viewed" or imaged by a single row of pixels forming the epipolar line of the scanning line in the image plane. However, in particular embodiments, the imaged scanning line—as represented by its respective epipolar line, like the epipolar line 252 in FIG. 10—may not be perfectly straight due to, for example, the laser-sensor misalignment issue. Hence, the spot size of an imaged light spot may be usually larger than one pixel pitch. As a result, if all the pixels that may be potentially imaging the same/common light spot are not sensed substantially simultaneously, certain scanned spots may not be detected at all. This may result in reduced accuracy of 3D depth measurements. As mentioned earlier, the pixels imaging a common light spot may be in multiple adjacent rows and/or columns. Therefore, in particular embodiments, multiple rows and/or columns may be selected substantially simultaneously to collect the pixel charges from such a group of pixels and, hence, to generate/acquire pixel-specific timestamp values for each pixel in the group substantially simultaneously. Such simultaneous generation of timestamp values may be accomplished by providing multiple TDC units per column of pixels as illustrated by multiple TDC arrays 233-236 in the embodiment of FIG. 10.

It is observed here that the sensor-scanner misalignment may be known beforehand, for example, as part of the practical limitations of a device manufacturing process. Hence, the system/device 15 may be designed and manufactured with multiple TDC arrays—the number of which may be pre-determined and may depend on the maximum "height" or pixel pitch of a scanning line in the image plane of the device 15. During the device manufacturing process or later, the processor 19 may be configured—in hardware and/or software—to operatively manage the pixel processing unit 46 such that, during operation of the device 15, the pixel processing unit 46 may "trigger" appropriate TDC array(s) to simultaneously capture timestamps for multiple pixels—within the same column and/or adjacent columns. In this manner, the depth measurement tolerance of the device 15 may be increased to accommodate not-so-perfect laser scan lines.

When a single light spot is imaged by multiple pixels as in case of the embodiment in FIG. 10, different approaches may be used to reconcile the corresponding multiple timestamp values—generated using multiple TDC arrays as discussed before—to determine the distance to that single light spot. In one embodiment, the reconciliation process may be performed by the pixel processing unit 46 (as suitably configured by the processor 19) and may result in a single timestamp value that can be used to determine the distance. In one approach, when a group of pixels detects the same light spot, all pixel-specific timestamp values may be used to obtain a single, group-specific timestamp value for the common light spot. For example, in one embodiment, only one of the generated pixel-specific timestamp values may be selected as a group-specific timestamp value for the common light spot. This group-specific timestamp value may be considered to be the "representative" of all pixel-specific timestamp values. The selected group-specific timestamp value may be used to establish a correspondence between the following: (i) the parameter "q" (shown in FIG. 4) for the pixel in the group of pixels whose pixel-specific timestamp value is closest to (or selected to be) the group-specific timestamp value, and (ii) the corresponding scan angle (θ) of the laser light source. The distance to the common light spot may be then determined using the equation (1) above. In one embodiment, the pixel-specific timestamp value associated with a pixel that is physically substantially in the center of the group of pixels may be selected as the group-specific timestamp value for the common light spot. Thus, for example, in case of the group of pixels in the darkened oval 256, the pixel in the row(n+2) 249 may be considered as the "central" pixel and, hence, the pixel-specific timestamp value of this pixel may be used as the group-specific timestamp value. However, in case of the group of pixels in the oval 257, there may be two "central" pixels—the pixel in the row(n+1) 248 or the pixel in the row(n+2) 249. In this case, the pixel-specific timestamp value of either of these pixels may be used as the group-specific timestamp value.

In another reconciliation approach, a pixel-specific depth value may be calculated for each pixel in a group of pixels. The pixel-specific timestamp value may be used during calculation of the pixel-specific depth value. Thereafter, the depth value associated with the pixel in the "center" of the group may be used as the final measurement of the distance to the common light spot. The "central" pixel may be determined as discussed in the preceding paragraph. Alternatively, a weighted average of all pixel-specific depth values may be used as the final measurement of the distance to the common light spot. The weights may depend on whether the pixel in question is in the middle or at the edge in the group of pixels. In one embodiment, the pixel-specific depth value for a middle pixel may be assigned more weight than that for an edge pixel.

As noted before, in certain embodiments, the timestamp values may allow the digital block 167 (FIG. 7A) to establish a temporal correlation among time-stamped light spots, thereby allowing the digital block 167 to determine distances to time-stamped light spots in the time-wise order specified by the temporal correlation—the distance to the earliest illuminated light spot being determined first, and so on, until the distance to the last-illuminated light spot is determined. This applies even when multiple rows/columns are selected substantially simultaneously and multiple TDC arrays are operational to generate multiple timestamps substantially simultaneously—as in case of the embodiment in FIG. 10. For example, for two or more groups of pixels in the selected rows of pixels, group-specific timestamp values may be used to establish a temporal correlation among respective time-stamped light spots. The distances to these time-stamped light spots may be then determined in the order specified by the temporal correlation.

Figure 11:
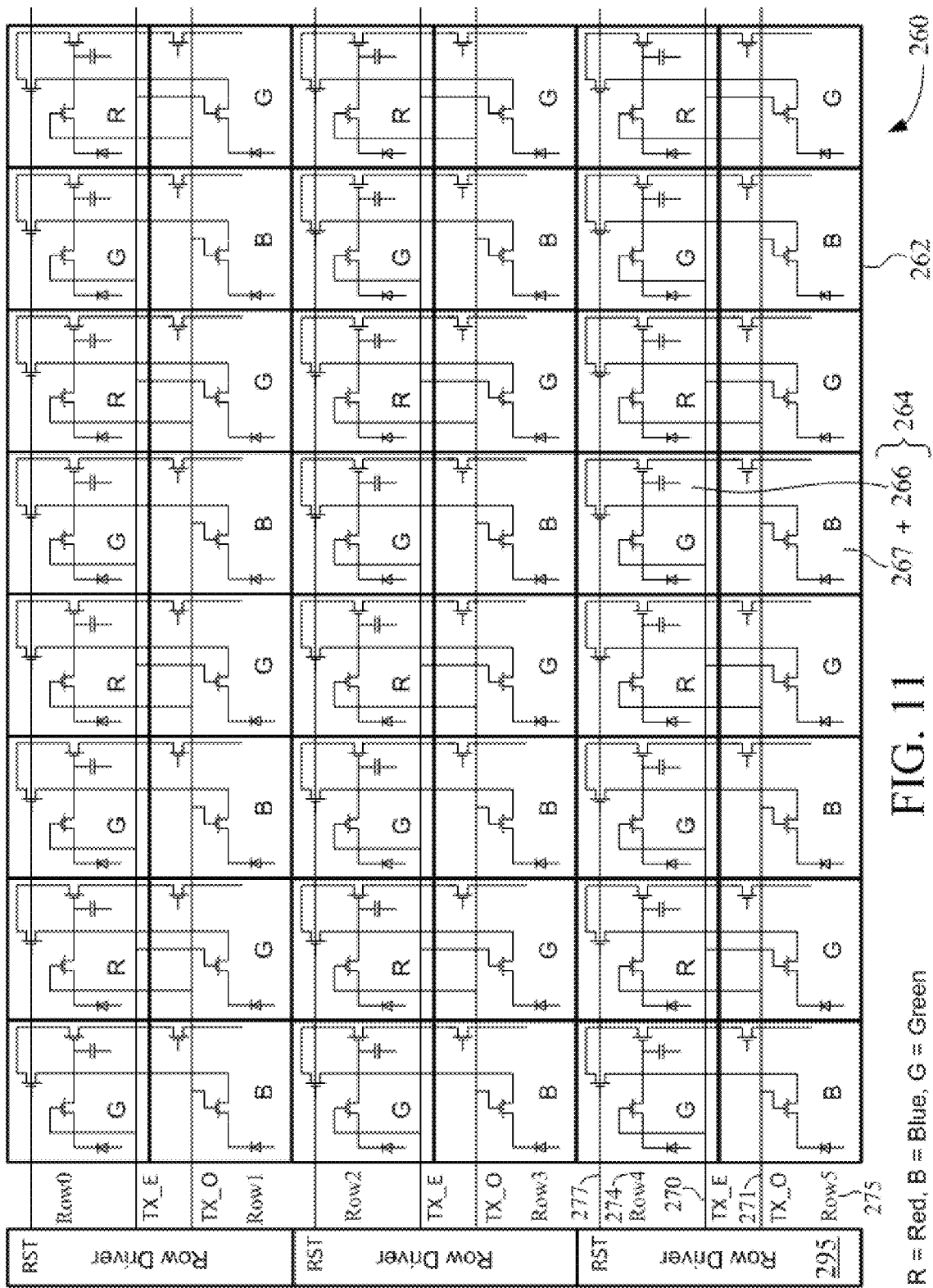
FIG. 11 shows an exemplary partial circuit layout depicting a 2D RGB array that may be used as a pixel array in the embodiments implementing the simultaneous timestamping approach according to the teachings of the present disclosure.

FIG. 11 shows an exemplary partial circuit layout 260 depicting a 2D RGB (Red, Green, Blue) array 262 that may be used as a pixel array in the embodiments implementing the simultaneous timestamping approach according to the teachings of the present disclosure. The pixel array 262, however, also may be used in the embodiments where simultaneous timestamping is not implemented. In other words, the pixel array 262 may be used regardless of whether the device 15 implements multiple TDC arrays or a single TDC array. However, the discussion below focuses on how simultaneous timestamping may be used with the pixel array 262. In particular embodiments, the RGB array 262 may be the pixel array 42 shown in FIG. 2. In other embodiments, the system 15 (FIGS. 1-2) may be a 3D or RGBZ (where "Z" refers to the depth dimension) camera system employing the RGB array 262 for depth measurements. For ease of discussion, the circuit layout 260 in FIG. 11 will be explained in conjunction with FIG. 12, which illustrates circuit details of a pixel (more specifically, a pixel-pair)—such as the pixel 264—in the RGB array 262 of FIG. 11. For ease of illustration and clarity, only 24 pixels (or pixel-pairs) similar to the pixel 264 and arranged in an 8×3 pixel configuration are shown in FIG. 11, and only one such pixel (the pixel 264) and some of the driver signals are identified in FIG. 11 using reference numerals. Each color pixel in the color pixel array 262 is identified using the corresponding letter for the color: "R" for the red color, "G" for the green color, and "B" for the blue color. Although the color pixels in the RGB array 262 are arranged in the known Bayer pattern, it is noted that color pixel arrays having different color pattern arrangements also may be used as pixel arrays in various embodiments of the present disclosure. For ease of illustration, biasing and other connection details like those shown in FIG. 6 are omitted from the pixel layout 260 in FIG. 11.

Figure 12:
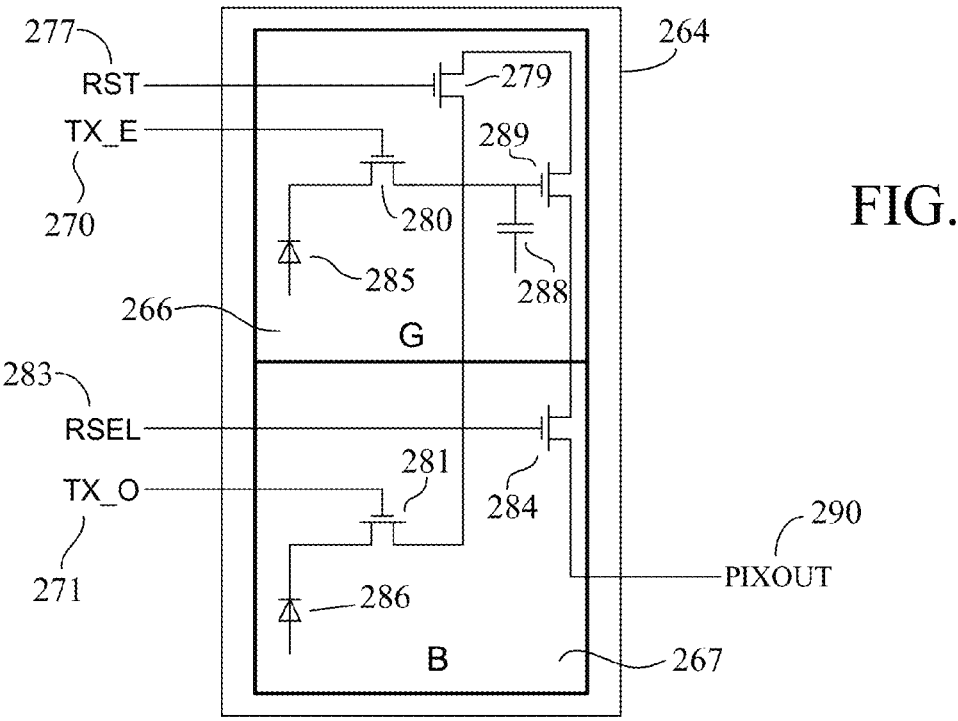
FIG. 12 illustrates circuit details of a pixel in the RGB array of FIG. 11.

Referring now to FIG. 12, it is observed that the pixel 264 is a 1×2 2-shared pixel in which two individually-selectable pixels 266-267 are arranged in a shared-pixel configuration forming a single "pixel" or "pixel-pair" 264 with a single pixel-specific output (PIXOUT). Although the term "pixel" is used to refer to the pixel-pair 264 as well as the individual pixels 266-267, for the sake of clarity, each constituent pixel 266, 267 may be occasionally referred to as a "sub-pixel" to distinguish it from the overall "pixel" (or pixel-pair) 264, as may be evident from the context of discussion. The pixel 264 in FIG. 12 is representative of each 2-shared pixel in FIG. 11 and, hence, the discussion of FIG. 12 applies to each 2-shared pixel in FIG. 11. As shown in FIG. 11, each 2-shared pixel in the pixel array 262 in FIG. 11 may have the same component configuration as the pixel 264 in FIG. 12. However, for ease of illustration, each such pixel and its sub-pixels are not individually identified in FIG. 11. In the embodiment of FIG. 12, the top pixel 266 is a green pixel, whereas the bottom pixel 267 is a blue pixel. However, as can be seen from FIG. 11, in other 2-shared pixels, the top pixel may be a red pixel and the bottom pixel may be a green pixel. Regardless of the top/bottom position of a green pixel, it is observed from FIG. 11 that all green pixels in a row of 2-shared pixels are connected to the same TX_E signal, one of which is identified in FIGS. 11-12 using the reference numeral "270." Similarly, regardless of the top/bottom position of a red or blue pixel, all red/blue pixels in a row of 2-shared pixels in the pixel array 262 are connected to the same TX_O signal, one of which is identified in FIGS. 11-12 using the reference numeral "271." Such a common connection-based configuration may result in a reduced number of TDC arrays and better ambient light rejection during 3D depth measurements, as discussed later with reference to FIGS. 13-14. For ease of discussion, the term "TX_E" may refer to a Transfer (TX) signal shown in connection with the even-numbered (E) rows of sub-pixels in the pixel array 262, whereas the term "TX_O" may refer to a TX signal shown in connection with the odd-numbered (O) rows of sub-pixels in the pixel array. In FIG. 11, Rows 0, 2, and 4 are the even-numbered rows, whereas Rows 1, 3, and 5 are the odd-numbered rows. Although six rows of sub-pixels—numbered as Row 0 through Row 5—are shown in FIG. 11, only the Row 4 and Row 5 are individually identified using the reference numerals "274" and "275", respectively, for ease of illustration. Other rows of sub-pixels may be similarly identified.

Because the architectural configuration and operation of each sub-pixel in the 2-shared pixel 264 is substantially similar to that of the pixels shown in the embodiment of FIG. 6 and because of the earlier detailed discussion of the pixel geometry of FIG. 6, only a brief overview of the operational details are provided here for the shared pixel 264 in FIG. 12. As shown in FIG. 12, a Reset (RST) signal 277 may be applied to the gate of the NMOS transistor 279, the TX_E signal 270 may be applied to the gate of the NMOS transistor 280, the TX_O signal 271 may be applied to the gate of the NMOS transistor 281, and a Row Select (RSEL) signal 283 may be applied to the gate of the NMOS transistor 284. The RST, RSEL, and TX signals in the embodiment of FIGS. 11-12 may be similar in functionality to those signals already discussed before with reference to FIGS. 6 and 8. The electrical charges generated by the photodiodes 285-286 may be collected as represented by the capacitor 288 at the gate terminal of the NMOS transistor 289. The two transfer gates 280-281 may pass the collected electrical charges for further processing using one (shared) source follower 289 for output. The output of the pixel 264 is the PIXOUT signal 290 as shown in FIG. 12. The pixel 264 is a 2-shared structure because two photodiodes 285-286 and two transfer gates 280-281 share one source follower 289 for output. Instead of NMOS transistors, in some embodiments, the pixel 264 may be formed of PMOS transistors or other different types of charge transfer devices. Like the pixel 264 in FIG. 12, each 2-shared pixel in the pixel array 262 may receive similar RST, RSEL, and TX signals and provide pixel-specific PIXOUT signals. As before, for ease of illustration, all such signals are not individually identified or shown in FIG. 11.

It is observed that pixels in the RGB array 262 in FIG. 11 are arranged in a shared-pixel configuration—like that shown in FIG. 12—in such a manner that the configuration results in a plurality of pairs of individually-selectable pixels of different colors—like the pixels 266-267 in FIG. 12. The pixels in a pair may be individually "selectable" via the respective TX_E or TX_O inputs. Each such pair of pixels also includes one Green (G) pixel, whereas the other pixel may be either a Red (R) or a Blue (B) pixel as can be seen from the layout of the pixel array 262 in FIG. 11.

The RST, RSEL, TX_E, and TX_O control signals may be supplied to each 2-shared pixel in the pixel array 262 by a respective row decoder/driver. In the embodiment of FIG. 11, three such row drivers are shown, but only one of them is identified using the reference numeral "295" for ease of illustration. Each row driver may generate and apply these control signals to the respective pair of rows of sub-pixels associated with the row driver. For example, in case of the pair of rows 274-275, the row driver 295 may apply the RST signal 277 to all of the G and R sub-pixels in row 274 (Row 4), and the RSEL signal 283 (not shown in FIG. 11, but shown in FIG. 12) to all of the B and G sub-pixels in row 275 (Row 5). Furthermore, the row driver 295 may also apply the TX_E signal 270 to only the green (G) sub-pixels in the rows 274-275 and the TX_O signal 271 to only the red (R) and blue (B) sub-pixels in the rows 274-275 as shown in FIG. 11. In one embodiment, the row drivers shown in FIG. 11 may be part of the pixel processing circuits 46 (FIG. 2). In another embodiment, a single row decoder/driver—like the row decoder/driver 116 shown in FIG. 6—may be used to provide appropriate control signals to the pixels in the RGB array 262. In the embodiment of FIG. 11, each row driver—like the row driver 295—may receive appropriate address or control information from, for example, the processor 19, to effectuate simultaneous selection of multiple rows of 2-shared pixels to generate multiple timestamps substantially simultaneously as per teachings of the present disclosure.

Figure 13:
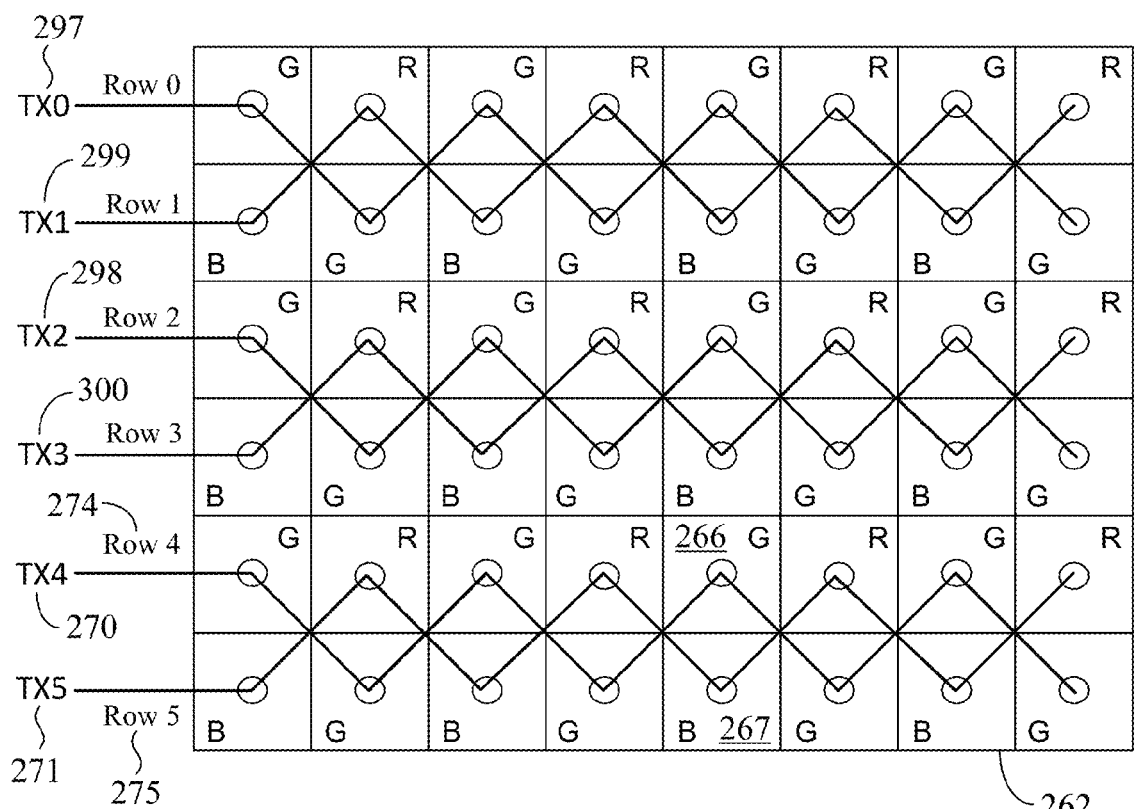
FIG. 13 is a simplified illustration of how various pixels in the RGB array of FIG. 11 may be activated with respective TX signals according to one embodiment of the present disclosure.

FIG. 13 is a simplified illustration of how various pixels in the RGB array 262 of FIG. 11 may be activated with respective TX signals according to one embodiment of the present disclosure. As noted before, the combination of RST, RSEL, and TX signals may be used to generate timestamps during 3D depth measurements. For ease of explanation of the Green-specific TX signals (TX_E signals) versus Red/Blue-specific TX signals (TX_O signals), only the connection of each pixel to a respective TX line is shown in FIG. 13 without any additional circuit details. Furthermore, for ease of discussion, the same reference numerals are used in FIG. 13 for the signals and circuit elements that are also shown in FIGS. 11-12. It is seen from FIG. 13 that each green (G) sub-pixel in a row of 2-shared pixels is connected to a respective TX_E signal. Thus, the G sub-pixels in the Rows 0-1 may be activated via the TX0 signal 297 (which represents the TX_E signal shown at Row 0 in FIG. 11), the G sub-pixels in the Rows 2-3 may be activated via the TX2 signal 298 (which represents the TX_E signal shown at Row 2 in FIG. 11), and the G sub-pixels in the Rows 4-5—like the G sub-pixel 266—may be activated via the TX4 signal 270 (which represents the TX_E signal shown at Row 4 in FIG. 11). Similarly, each red (R) and blue (B) sub-pixel in a row of 2-shared pixels is connected to a respective TX_O signal. Thus, the R and B sub-pixels in the Rows 0-1 may be activated via the TX1 signal 299 (which represents the TX_O signal shown at Row 1 in FIG. 11), the R/B sub-pixels in the Rows 2-3 may be activated via the TX3 signal 300 (which represents the TX_O signal shown at Row 3 in FIG. 11), and the R/B sub-pixels in the Rows 4-5—like the B sub-pixel 267—may be activated via the TX5 signal 271 (which represents the TX_O signal shown at Row 5 in FIG. 11).

As explained below with reference to FIG. 14, when the laser light source 22 (FIGS. 1-2) is a green (G) light laser, the pixel activation arrangement shown in the exemplary embodiment of FIG. 13 may substantially reduce the number of TDC arrays that may be needed to generate simultaneous timestamps during 3D depth measurements as per teachings of the present disclosure to overcome epipolar line misalignment and curvature.

Figure 14:
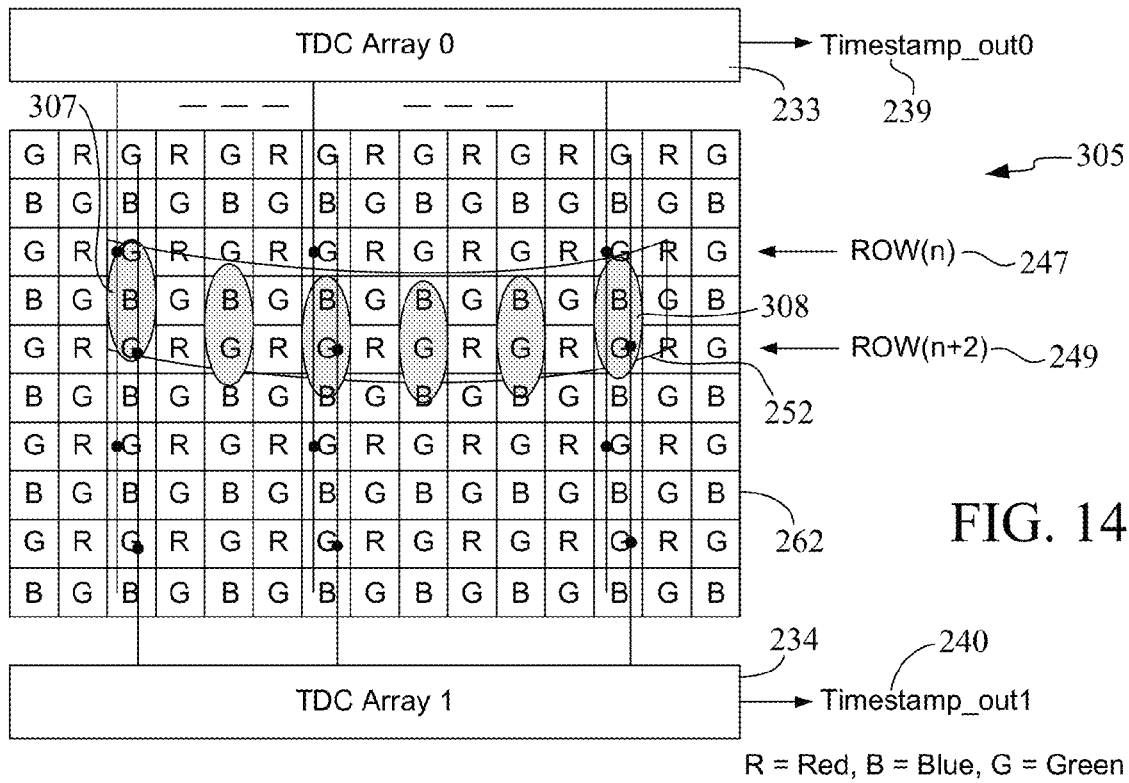
FIG. 14 is an exemplary layout showing how the simultaneous timestamping approach may be implemented with a reduced number of TDC arrays using the RGB array of FIG. 11 according to one embodiment of the present disclosure.

FIG. 14 is an exemplary layout 305 showing how the simultaneous timestamping approach may be implemented with a reduced number of TDC arrays using the RGB array 262 of FIG. 11 according to one embodiment of the present disclosure. The 15×10 version of the RGB array 262 in FIG. 14 may be considered a specific example of the more generic pixel array 229 in FIG. 10. As discussed below, the usage of the pixel array 262 with a green light laser may substantially reduce the total number of TDC arrays—from four arrays 233-236 in the embodiment of FIG. 10 to just two arrays 233-234 in the embodiment of FIG. 14. For ease of comparison of the layouts in FIGS. 10 and 14, the same reference numerals are used to the extent possible. It is, however, understood that the usage of the same reference numerals is for ease of discussion only; it does not imply that the embodiments in FIGS. 10 and 14 are identical or that the embodiment in FIG. 14 is the only way to practically implement the more general embodiment of FIG. 10. The layout 305 in FIG. 14 is shown merely as an example to illustrate how the device 15 (FIGS. 1-2) may be configured with a reduced number of TDC arrays by using the RGB array 262—as the 2D pixel array 42 (FIG. 2)—in conjunction with a green light laser as the laser scanner 33 (FIG. 2). Because of the earlier discussion of FIG. 10, only the relevant aspects are discussed with reference to FIG. 14.

It is observed that when multiple rows of 2-shared pixels need to be enabled in the RGB array 262 to generate simultaneous timestamps to overcome the misalignment and curvature of the epipolar line 252, the row-specific RSEL signal (like the RSEL signal 283 in FIG. 12) may be asserted in the manner illustrated in the embodiment of FIG. 8. In one embodiment, the TX_E and the TX_O signals may be asserted "high" in a alternative manner (not shown) to "activate" the respective sub-pixel and to transfer the charge of the activated sub-pixel to the corresponding TDC array to generate sub-pixel-specific timestamps substantially simultaneously. In the embodiment of FIG. 14, only the green (G) sub-pixels are shown connected to respective TDC arrays 233-234. It is observed that if two more TDC arrays—like the TDC arrays 235-236 shown in FIG. 10—are also used to connect to the respective blue (B) and red (R) sub-pixels, such extra TDC arrays may not provide any meaningful contribution to the overall 3D depth measurement because of the following:

(i) The timestamping approach of the present disclosure is primarily used during 3D depth measurements, where the color content of the received luminance is not relevant.

(ii) When a green laser is employed with an RGB sensor, the R and B sub-pixels typically only collect ambient signals during 3D depth measurements. Hence, during 3D depth measurements, it may not be necessary to also generate timestamp values for R and B sub-pixels.

(iii) Each 2-shared pixel in the RGB array 262 has one G sub-pixel and one R or B sub-pixel. Therefore, non-activation of R and B sub-pixels during 3D depth measurements may not affect the accuracy of the computed depth values (or the resolution of the final depth profile) because pixel-specific timestamp values are already obtained from the activated green sub-pixels.

Therefore, when a green laser light source is used for point scan of a 3D object during depth measurements, it may be preferable to enable the green pixels only. Such selective enablement may be accomplished by the modified layout of FIGS. 11 and 13 where TX_E and TX_O signals are provided in such a manner as to activate only the green pixels and the R|B pixels, respectively. In FIG. 14, black dots are used to show connection of only the green pixels in a column to a respective TDC array in an alternating manner. However, only some of the pixels are identified in this manner for ease of illustration. Thus, for example, the top green pixel in the darkened oval 307 is shown connected to the top TDC array 233 whereas the bottom green pixel in the darkened oval 307 is shown connected to the bottom TDC array 234. Similar connections are also shown for the green pixels in the darkened oval 308.

It is observed from FIG. 14 that due to the curvature of the epipolar line 252, multiple rows of 2-shared pixels may be simultaneously selected—here, Row(n) 247 and Row(n+2) 249 are the selected rows. However, using the darkened oval 308 as an example, it is seen that even though multiple rows of 2-shared pixels are simultaneously selected, only the green sub-pixels may be activated in the selected rows of pixels. This approach may provide for better ambient light rejection during 3D depth measurements, without reducing the Signal-to-Noise Ration (SNR) of the charge collected from the green sub-pixels. Furthermore, the green-only activation approach in the embodiment of FIG. 14 may require only half the number of TDC arrays than those shown in the embodiment of FIG. 10, thereby reducing the hardware (and, hence, power consumption) in the pixel processing unit 46 (FIG. 2). As noted before, the pixel-specific timestamp value of a 2-shared pixel may be given by the timestamp value for the activated respective green sub-pixel only; there may be no need to also generate a timestamp value for the R or B sub-pixel of the 2-shared pixel.

Instead of a green laser, if the system 15 (FIG. 1) uses a different laser in conjunction with the RGB array 262, then it may be desirable to enable the R and B pixels as well. In that case, the four TDC array based configuration of FIG. 10 may be used instead of the embodiment in FIG. 14. The R, G, B pixels may be then connected to the TDC arrays 233-236 in the manner discussed before with reference to FIG. 10. Furthermore, for an NIR sensor using shared pixels in a configuration similar to that of FIG. 12, all shared pixels in the selected rows may be enabled at the same time for 3D depth measurements using a reduced TDC array-based configuration similar to that shown in FIG. 14. The enablement of all shared pixels may result in a better SNR during 3D depth measurements. A similar approach can also be used for a shared pixel-based RWB sensor with any colored or IR laser source.

Figure 15:
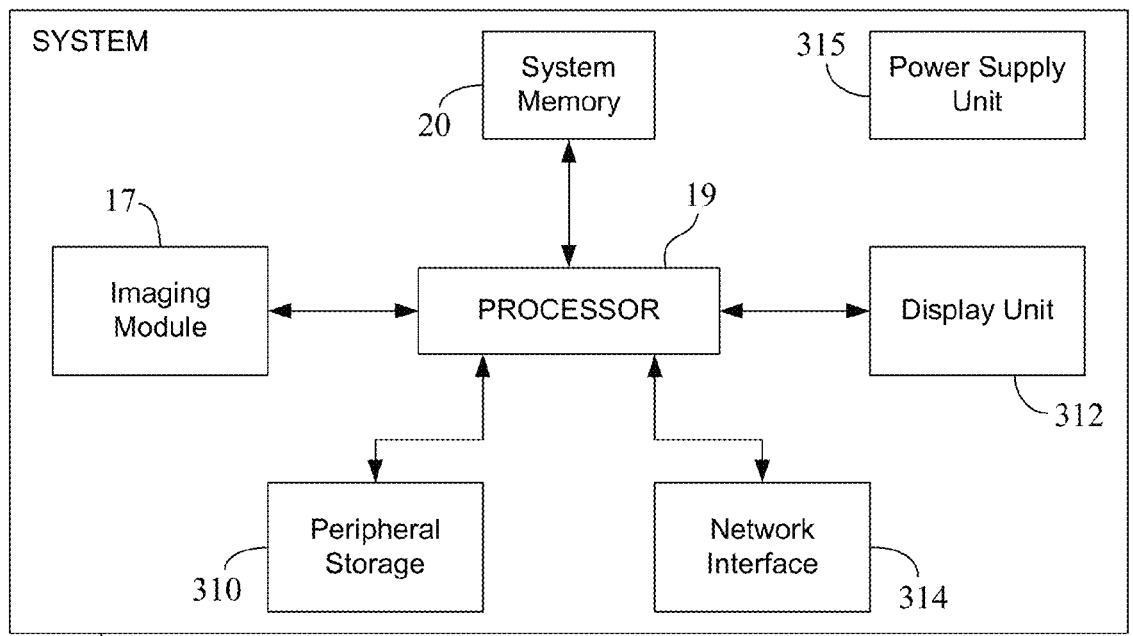
FIG. 15 depicts an overall layout of the system in FIGS. 1-2 according to one embodiment of the present disclosure.

FIG. 15 depicts an overall layout of the system 15 in FIGS. 1-2 according to one embodiment of the present disclosure. Hence, for ease of reference and discussion, the same reference numerals are used in FIGS. 1-2 and 15 for the common system components/units.

As discussed earlier, the imaging module 17 may include the desired hardware shown in the exemplary embodiments of FIGS. 2, 6, 7A-7B, and 10 (or 14) to accomplish 2D imaging, 3D depth measurements, and simultaneous time-stamping of multiple rows as per the inventive aspects of the present disclosure. The processor 19 may be configured to interface with a number of external devices. In one embodiment, the imaging module 17 may function as an input device that provides data inputs—in the form of pixel event data such as, for example, the processed data output 170 in FIG. 7A—to the processor 19 for further processing. The processor 19 may also receive inputs from other input devices (not shown) that may be part of the system 15. Some examples of such input devices include a computer keyboard, a touchpad, a touch-screen, a joystick, a physical or virtual "clickable button," and/or a computer mouse/pointing device. In FIG. 15, the processor 19 is shown coupled to the system memory 20, a peripheral storage unit 310, one or more output devices 312, and a network interface unit 314. In FIG. 15, a display unit is shown as an output device 312. In some embodiments, the system 15 may include more than one instance of the devices shown. Some examples of the system 15 include a computer system (desktop or laptop), a tablet computer, a mobile device, a cellular phone, a video gaming unit or console, a machine-to-machine (M2M) communication unit, a robot, an automobile, a virtual reality equipment, a stateless "thin" client system, a car's dash-cam or rearview camera system, or any other type of computing or data processing device. In various embodiments, all of the components shown in FIG. 15 may be housed within a single housing. Thus, the system 15 may be configured as a standalone system or in any other suitable form factor. In some embodiments, the system 15 may be configured as a client system rather than a server system.

In particular embodiments, the system 15 may include more than one processor (e.g., in a distributed processing configuration). When the system 15 is a multiprocessor system, there may be more than one instance of the processor 19 or there may be multiple processors coupled to the processor 19 via their respective interfaces (not shown). The processor 19 may be a System on Chip (SoC) and/or may include more than one Central Processing Units (CPUs).

As mentioned earlier, the system memory 20 may be any semiconductor-based storage system such as, for example, DRAM, SRAM, PRAM, RRAM, CBRAM, MRAM, STT-MRAM, and the like. In some embodiments, the memory unit 20 may include at least one 3DS memory module in conjunction with one or more non-3DS memory modules. The non-3DS memory may include Double Data Rate or Double Data Rate 2, 3, or 4 Synchronous Dynamic Random Access Memory (DDR/DDR2/DDR3/DDR4 SDRAM), or Rambus® DRAM, flash memory, various types of Read Only Memory (ROM), etc. Also, in some embodiments, the system memory 20 may include multiple different types of semiconductor memories, as opposed to a single type of memory. In other embodiments, the system memory 20 may be a non-transitory data storage medium The peripheral storage unit 310, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, and the like. In some embodiments, the peripheral storage unit 310 may include more complex storage devices/systems such as disk arrays (which may be in a suitable RAID (Redundant Array of Independent Disks) configuration) or Storage Area Networks (SANs), and the peripheral storage unit 310 may be coupled to the processor 19 via a standard peripheral interface such as a Small Computer System Interface (SCSI) interface, a Fibre Channel interface, a Firewire® (IEEE 1394) interface, a Peripheral Component Interface Express (PCI Express™) standard based interface, a Universal Serial Bus (USB) protocol based interface, or another suitable interface. Various such storage devices may be non-transitory data storage media.

The display unit 312 may be an example of an output device. Other examples of an output device include a graphics/display device, a computer screen, an alarm system, a CAD/CAM (Computer Aided Design/Computer Aided Machining) system, a video game station, a smartphone display screen, or any other type of data output device. In some embodiments, the input device(s), such as the imaging module 17, and the output device(s), such as the display unit 312, may be coupled to the processor 19 via an I/O or peripheral interface(s).

In one embodiment, the network interface 314 may communicate with the processor 19 to enable the system 15 to couple to a network (not shown). In another embodiment, the network interface 314 may be absent altogether. The network interface 314 may include any suitable devices, media and/or protocol content for connecting the system 15 to a network—whether wired or wireless. In various embodiments, the network may include Local Area Networks (LANs), Wide Area Networks (WANs), wired or wireless Ethernet, telecommunication networks, or other suitable types of networks.

The system 15 may include an on-board power supply unit 315 to provide electrical power to various system components illustrated in FIG. 15. The power supply unit 315 may receive batteries or may be connectable to an AC electrical power outlet. In one embodiment, the power supply unit 315 may convert solar energy or other renewable energy into electrical power.

In one embodiment, the imaging module 17 may be integrated with a high-speed interface such as, for example, a Universal Serial Bus 2.0 or 3.0 (USB 2.0 or 3.0) interface or above, that plugs into any Personal Computer (PC) or laptop. A non-transitory, computer-readable data storage medium, such as, for example, the system memory 20 or a peripheral data storage unit such as a CD/DVD may store program code or software. The processor 19 and/or the digital processing block 167 (FIG. 7A) in the imaging module 17 may be configured to execute the program code, whereby the device 15 may be operative to perform the 2D imaging and 3D depth measurements (and related simultaneous timestamping of multiple rows) as discussed hereinbefore—such as, for example, the operations discussed earlier with reference to FIGS. 1-14. For example, in certain embodiments, upon execution of the program code, the processor 19 and/or the digital block 167 may suitably configure (or activate) relevant circuit components—such as the TDC arrays 233-236 in FIG. 10 or the TDC arrays 233-234 in FIG. 14—to appropriately carry out simultaneous timestamping as per teachings of the present disclosure with the help of those components and to thereby increase the system's tolerance of curved or misaligned epipolar lines. The program code or software may be proprietary software or open source software which, upon execution by the appropriate processing entity—such as the processor 19 and/or the digital block 167—may enable the processing entity to acquire timestamps of multiple pixels (in multiple rows) at the same time, capture pixel events using their precise timing, process them, render them in a variety of formats, and display them in the 2D and/or 3D formats. As noted earlier, in certain embodiments, the digital processing block 167 in the imaging module 17 may perform some of the processing of pixel event signals before the pixel output data are sent to the processor 19 for further processing and display. In other embodiments, the processor 19 may also perform the functionality of the digital block 167, in which case, the digital block 167 may not be a part of the imaging module 17.

In the preceding description, for purposes of explanation and not limitation, specific details are set forth (such as particular architectures, waveforms, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 1-2) can represent conceptual views of illustrative circuitry or other functional units embodying the principles of the technology. Similarly, it will be appreciated that the flowcharts in FIGS. 3 and 9 represent various processes which may be substantially performed by a processor (e.g., the processor 19 in FIG. 15 and/or the digital block 167 in FIG. 7A). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-14 also may be provided by such a processor, in the hardware and/or software.

When certain inventive aspects require software-based processing, such software or program code may reside in a computer-readable data storage medium. As noted earlier, such data storage medium may be part of the peripheral storage 310, or may be part of the system memory 20 or any internal memory (not shown) of the image sensor unit 24, or the processor's 19 internal memory (not shown). In one embodiment, the processor 19 or the digital block 167 may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the imaging module 17 or the system 15 comprising such an imaging module according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various 2D and 3D imaging functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which the same image sensor—that is, all of the pixels in the image sensor—may be used to capture both a 2D image of a 3D object and 3D depth measurements for the object. The image sensor may be part of a camera in a mobile device such as, for example, a smartphone. A laser light laser source may be used to point scan the surface of the object with light spots, which may be then detected by a pixel array in the image sensor to generate the 3D depth profile of the object using triangulation. In the 3D mode, the laser may project a sequence of light spots on the surface of the object along a scan line. The illuminated light spots may be detected using a row of pixels in the pixel array such that the row forms an epipolar line of the scan line. The detected light spots may be timestamped to remove any ambiguity in triangulation and, hence, to reduce the amount of depth computation and system power. A timestamp may also provide a correspondence between the pixel location of a captured laser spot and the respective scan angle of the laser light source to determine depth using triangulation. An ADC unit in the image sensor may operate as a Time-to-Digital Converter (TDC) to generate timestamps. In the event of a misalignment between the pixel array and the laser scanner, the epipolar line of a scanning line may not be perfectly straight—it may be curved and may be larger than one pixel pitch. To increase the tolerance of the 3D camera system to such sensor-scanner misalignment and to enable the camera system to perform 3D depth measurements in the presence of not-so-perfect scanning/epipolar lines, multiple TDC arrays may be provided to acquire timestamps of multiple pixels (in multiple rows) substantially simultaneously. Multiple timestamp values associated with an illuminated light spot may be then reconciled to obtain a final timestamp value for the light spot.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:
1. A method comprising:
 performing a one-dimensional (1D) point scan of a three-dimensional (3D) object along a scanning line using a light source, wherein the point scan projects a sequence of light spots on a surface of the 3D object;
 selecting a plurality of rows of pixels in an image sensor, wherein the image sensor has a plurality of pixels arranged in a two-dimensional (2D) array forming an image plane, and wherein at least one of the plurality of the selected rows forms a portion of an epipolar line of the scanning line on the image plane;

for pixels in the selected row of pixels, sensing a pixel-specific detection of a corresponding light spot in the sequence of light spots;

for a group of pixels detecting a common light spot, generating a pixel-specific timestamp value for each pixel in the group substantially simultaneously; and determining a distance to the common light spot on the surface of the 3D object based at least on the generated pixel-specific timestamp values and on a scan angle used by the light source for projecting the common light spot.

2. The method of claim 1, wherein at least two rows in the plurality of rows of pixels are adjacent rows.

3. The method of claim 1, wherein the 2D array is a Complementary Metal Oxide Semiconductor (CMOS) array.

4. The method of claim 1, wherein the 2D array is a Red Green Blue (RGB) array of pixels in which Red, Green, and Blue pixels are arranged in a Bayer pattern, and wherein selecting the plurality of rows of pixels includes activating only Green pixels in the selected rows of pixels, and wherein generating the pixel-specific timestamp value includes generating the pixel-specific timestamp value only for each activated Green pixel.

5. The method of claim 4, wherein pixels in the RGB array are arranged in a shared-pixel configuration resulting in a plurality of pairs of individually-selectable pixels of different colors, and wherein each pair of pixels includes one Green pixel.

6. The method of claim 1, wherein generating the pixel-specific timestamp value includes generating the pixel-specific timestamp value using a binary counter.

7. The method of claim 1, wherein determining the distance to the common light spot includes:

using all pixel-specific timestamp values associated with the group of pixels to obtain a group-specific timestamp value for the common light spot;

using the group-specific timestamp value for the common light spot to establish a correspondence between the following:

an offset distance between a collection optics associated with the image sensor and a pixel in the group of pixels whose pixel-specific timestamp value is closest to the group-specific timestamp value for the common light spot, and the scan angle of the light source; and determining the distance to the common light spot based on the offset distance and the scan angle.

8. The method of claim 7, wherein using all pixel-specific timestamp values includes:

for the group of pixels, selecting the pixel-specific timestamp value associated with a pixel that is physically substantially in a center of the group of pixels as the group-specific timestamp value for the common light spot.

9. The method of claim 7, further comprising:

for two or more groups of pixels in the selected rows of pixels, using group-specific timestamp values to establish a temporal correlation among respective time-stamped light spots; and determining distances to the time-stamped light spots in an order specified by the temporal correlation.

10. The method of claim 1, wherein determining the distance to the common light spot includes:

for each pixel in the group of pixels, calculating a pixel-specific depth value; and performing one of the following to determine the distance to the common light spot:

selecting the pixel-specific depth value associated with a pixel that is physically substantially in a center of the group of pixels as the distance to the common light spot, and using a weighted average of all pixel-specific depth values associated with the group of pixels as the distance to the common light spot.

11. An imaging unit comprising:

a light source operative to perform a one-dimensional (1D) point scan of a three-dimensional (3D) object along a scanning line, wherein the point scan projects a sequence of light spots on a surface of the 3D object; and an image sensor unit that includes:

a plurality of pixels arranged in a two-dimensional (2D) pixel array forming an image plane, wherein each pixel in a column of pixels in the 2D pixel array is associated with a respective row of pixels in the 2D pixel array, and wherein each pixel in the column of pixels is operative to detect a corresponding light spot in the sequence of light spots, a plurality of Analog-to-Digital Converter (ADC) units per column of pixels in the 2D pixel array, wherein at least two adjacent pixels in a column of pixels are connected to different ADC units, and wherein each ADC unit is operative to generate a pixel-specific timestamp value for a respective pixel connected thereto in response to a pixel-specific detection of the corresponding light spot by the respective pixel, and a processing unit coupled to the plurality of ADC units, wherein the processing unit is operative to perform the following:

select a plurality of rows of pixels in the 2D pixel array associated with a group of pixels detecting a common light spot in the sequence of light spots, wherein at least one of the plurality of the selected rows forms a portion of an epipolar line of the scanning line on the image plane, for pixels in the selected rows of pixels, sense a pixel-specific detection of the common light spot, trigger the ADC units associated with the pixels in the group of pixels so as to substantially simultaneously generate a pixel-specific timestamp value for each pixel in the group of pixels, and determine a distance to the common light spot on the surface of the 3D object based at least on the generated pixel-specific timestamp values and on a scan angle used by the light source for projecting the common light spot.

12. The imaging unit of claim 11, wherein the 2D pixel array is a Red Green Blue (RGB) array of pixels in which Red, Green, and Blue pixels are arranged in a shared-pixel configuration resulting in a plurality of pairs of individually-selectable pixels of different colors, wherein each pair of pixels includes one Green pixel, and wherein two consecutive Green pixels in a column are connected to two different ADC units, and wherein the processing unit is operative to further perform the following:

activate only Green pixels in the group of pixels, sense the pixel-specific detection of the common light spot only for each activated Green pixel, and trigger the ADC units associated only with the Green pixels in the group of pixels so as to substantially simultaneously generate the pixel-specific timestamp value only for each activated Green pixel.

13. The imaging unit of claim 11, wherein the processing unit is operative to perform the following to determine the distance to the common light spot:
for the group of pixels, select only one of the generated pixel-specific timestamp values as a group-specific timestamp value for the common light spot;
use the group-specific timestamp value for the common light spot to establish a correspondence between the following:
an offset distance between a collection optics associated with the image sensor unit and a pixel in the group of pixels whose pixel-specific timestamp value is selected as the group-specific timestamp value for the common light spot, and
the scan angle of the light source; and
determine the distance to the common light spot based on the offset distance and the scan angle.

14. A system comprising:
a light source operative to perform a one-dimensional (1D) point scan of a three-dimensional (3D) object along a scanning line, wherein the point scan projects a sequence of light spots on a surface of the 3D object;
a plurality of pixels arranged in a two-dimensional (2D) pixel array forming an image plane, wherein each pixel in a column of pixels in the 2D pixel array is associated with a respective row of pixels in the 2D pixel array, and wherein each pixel in the column of pixels is operative to detect a corresponding light spot in the sequence of light spots;
a plurality of Analog-to-Digital Converter (ADC) units per column of pixels in the 2D pixel array, wherein at least two adjacent pixels in a column of pixels are connected to different ADC units, and wherein each ADC unit is operative to generate a pixel-specific timestamp value for a respective pixel connected thereto in response to a pixel-specific detection of the corresponding light spot by the respective pixel;
a memory for storing program instructions; and
a processor coupled to the memory and to the plurality of ADC units, wherein the processor is configured to execute the program instructions, whereby the processor is operative to perform the following:
select a plurality of rows of pixels in the 2D pixel array associated with a group of pixels detecting a common light spot in the sequence of light spots, wherein at least one of the plurality of the selected rows forms a portion of an epipolar line of the scanning line on the image plane,
for pixels in the selected rows of pixels, sense a pixel-specific detection of the common light spot,
trigger the ADC units associated with the pixels in the group of pixels so as to substantially simultaneously generate a pixel-specific timestamp value for each pixel in the group of pixels, and
determine a distance to the common light spot on the surface of the 3D object based at least on the generated pixel-specific timestamp values and on a scan angle used by the light source for projecting the common light spot.

15. The system of claim 14, wherein the 2D pixel array is a Complementary Metal Oxide Semiconductor (CMOS) array, and wherein each pixel in the row of pixels is one of the following:
a Four Transistor (4T) pixel;
a Three Transistor (3T) pixel;
a Two Transistor (2T) pixel;
a One Transistor (1T) pixel;
a shared-transistor pixel;
a 1×2 2-shared pixel; and
a 1×4 4-shared pixel.

16. The system of claim 14, wherein the light source is one of the following:
a laser light source;
a visible light source;
a point light source;
a near infrared laser light source;
a monochromatic illumination source; and
an X-Y addressable light source.

17. The system of claim 14, wherein, upon execution of the program instructions, the processor is operative to perform the following to determine the distance to the common light spot:
for each pixel in the group of pixels, calculate a pixel-specific depth value; and
perform one of the following to determine the distance to the common light spot:
select the pixel-specific depth value associated with a pixel that is physically substantially in a center of the group of pixels as the distance to the common light spot, and
use a weighted average of all pixel-specific depth values associated with the group of pixels as the distance to the common light spot.

18. The system of claim 14, wherein adjacent pixels in each selected row of pixels in the 2D pixel array have different colors, and
wherein, upon execution of the program instructions, the processor is operative to further perform the following:
activate only those pixels in the selected rows of pixels that have the same color, and
trigger the ADC units associated only with the activated pixels in the group of pixels so as to substantially simultaneously generate the pixel-specific timestamp value only for each activated pixel.

19. The system of claim 14, wherein, upon execution of the program instructions, the processor is operative to perform the following to determine the distance to the common light spot:
use all pixel-specific timestamp values associated with the group of pixels to obtain a group-specific timestamp value for the common light spot;
use the group-specific timestamp value for the common light spot to establish a correspondence between the following:
an offset distance between a collection optics associated with the 2D pixel array and a pixel in the group of pixels whose pixel-specific timestamp value is closest to the group-specific timestamp value for the common light spot, and
the scan angle of the light source; and
determine the distance to the common light spot based on the offset distance and the scan angle.

20. The system of claim 14, wherein the system is one of the following:
a mobile device;
a smartphone;
a tablet computer;
a computing unit;
a User Equipment (UE);
an automobile;

a virtual reality equipment; and
a robot.

* * * * *